United States Patent
Gronemeyer

(12) 
(10) Patent No.: US 6,304,216 B1
(45) Date of Patent: Oct. 16, 2001

(54) SIGNAL DETECTOR EMPLOYING CORRELATION ANALYSIS OF NON-UNIFORM AND DISJOINT SAMPLE SEGMENTS

(75) Inventor: Steven A. Gronemeyer, Cedar Rapids, IA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/281,741

(22) Filed: Mar. 30, 1999

(51) Int. Cl.$^7$ .................................................. G01S 3/16

(52) U.S. Cl. ............... 342/378; 342/357.06; 342/357.12; 375/130; 375/140; 375/147; 375/150

(58) Field of Search .......................... 342/357.01–357.17, 342/378; 375/130–153, 224–228

(56) References Cited

U.S. PATENT DOCUMENTS

| | | |
|---|---|---|
| 3,604,911 | 9/1971 | Schmitt . |
| 3,975,628 | 8/1976 | Graves et al. . |
| 4,426,712 | 1/1984 | Gorski-Popiel . |
| 4,445,118 | 4/1984 | Taylor et al. . |
| 4,463,357 | 7/1984 | MacDoran . |
| 4,578,678 | 3/1986 | Hurd . |
| 4,667,203 | 5/1987 | Counselman, III . |
| 4,701,934 | 10/1987 | Jasper . |
| 4,754,465 | 6/1988 | Trimble . |
| 4,785,463 | 11/1988 | Janc et al. . |
| 4,809,005 | 2/1989 | Counselman, III . |
| 4,821,294 | 4/1989 | Thomas, Jr. . |
| 4,890,233 | 12/1989 | Ando et al. . |
| 4,894,662 | 1/1990 | Counselman . |
| 4,894,842 | 1/1990 | Broekhoven et al. . |
| 4,992,720 | 2/1991 | Hata . |
| 4,998,111 | 3/1991 | Ma et al. . |
| 5,014,066 | 5/1991 | Counselman, III . |
| 5,018,088 | 5/1991 | Higbie . |
| 5,036,329 | 7/1991 | Ando . |
| 5,043,736 | 8/1991 | Darnell et al. . |
| 5,108,334 | 4/1992 | Eschenbach et al. . |
| 5,148,042 | 9/1992 | Nakazoe . |
| 5,153,591 | 10/1992 | Clark . |
| 5,179,724 | 1/1993 | Lindoff . |
| 5,202,829 | 4/1993 | Geier . |
| 5,225,842 | 7/1993 | Brown et al. . |
| 5,253,268 | 10/1993 | Omura et al. . |
| 5,276,765 | 1/1994 | Fremman et al. . |
| 5,293,170 | 3/1994 | Lorenz et al. . |
| 5,293,398 | 3/1994 | Hamao et al. . |
| 5,297,097 | 3/1994 | Etoh et al. . |
| 5,311,195 | 5/1994 | Mathis et al. . |
| 5,323,164 | 6/1994 | Endo . |

(List continued on next page.)

FOREIGN PATENT DOCUMENTS

| | | |
|---|---|---|
| 0511741 A1 | 11/1992 | (EP) . |
| 0639901 A2 | 2/1995 | (EP) . |
| 0511741 B1 | 11/1997 | (EP) . |
| 0639901 A3 | 11/1998 | (EP) . |
| 08/065205 A | 3/1996 | (JP) . |
| WO 92/13392 A1 | 8/1992 | (WO) . |
| WO 00/19644 A2 | 4/2000 | (WO) . |

OTHER PUBLICATIONS

D. J. R. Van Nee and A. J. R. M. Coenen, "New Fast GPS Code–Acquisition Technique Using FFT," Jan. 17, 1991, *Electronics Letters*, vol. 27, No. 2, pp. 158–160.

Primary Examiner—Bernarr E. Gregory
(74) Attorney, Agent, or Firm—Thomas, Kayden, Horstemeyer & Risley, L.L.P.

(57) ABSTRACT

A signal detector is provided in which correlation analyses of multiple segments of a received signal from separate and distinct periods of time are combined to improve the detection capability of the signal detector. In one embodiment, the signal detector is part of a GPS receiver.

87 Claims, 18 Drawing Sheets

U.S. PATENT DOCUMENTS

| | | |
|---|---|---|
| 5,343,209 | 8/1994 | Sennott et al. . |
| 5,345,244 | 9/1994 | Gildea et al. . |
| 5,347,536 | 9/1994 | Meehan . |
| 5,352,970 | 10/1994 | Armstrong, II . |
| 5,363,030 | 11/1994 | Ford et al. . |
| 5,378,155 | 1/1995 | Eldridge . |
| 5,379,224 | 1/1995 | Brown et al. . |
| 5,396,515 | 3/1995 | Dixon et al. . |
| 5,402,346 | 3/1995 | Lion et al. . |
| 5,402,347 | 3/1995 | McBurney et al. . |
| 5,410,747 | 4/1995 | Ohmagari et al. . |
| 5,416,712 | 5/1995 | Geier et al. . |
| 5,418,818 | 5/1995 | Marchetto et al. . |
| 5,420,593 | 5/1995 | Niles . |
| 5,440,313 | 8/1995 | Osterdock et al. . |
| 5,450,344 | 9/1995 | Woo et al. . |
| 5,498,239 | 3/1996 | Galel et al. . |
| 5,504,684 | 4/1996 | Lau et al. . |
| 5,546,445 | 8/1996 | Dennison et al. . |
| 5,548,613 | 8/1996 | Kahu et al. . |
| 5,550,811 | 8/1996 | Kahu et al. . |
| 5,568,473 | 10/1996 | Hemmati . |
| 5,577,023 | 11/1996 | Marum et al. . |
| 5,577,025 | 11/1996 | Skinner et al. . |
| 5,592,173 | 1/1997 | Lau et al. . |
| 5,594,453 | 1/1997 | Rodal et al. . |
| 5,608,722 | 3/1997 | Miller . |
| 5,623,485 | 4/1997 | Bi . |
| 5,625,668 | 4/1997 | Loomis et al. . |
| 5,640,429 | 6/1997 | Michels et al. . |
| 5,640,431 | 6/1997 | Bruckert et al. . |
| 5,642,377 | 6/1997 | Chung et al. . |
| 5,644,591 * | 7/1997 | Sutton .................................. 375/142 |
| 5,649,000 | 7/1997 | Lee et al. . |
| 5,650,792 | 7/1997 | Moore et al. . |
| 5,654,718 | 8/1997 | Beason et al. . |
| 5,663,734 | 9/1997 | Krasner . |
| 5,663,735 | 9/1997 | Eschenbach . |
| 5,689,814 | 11/1997 | Hagisawa et al. . |
| 5,722,061 | 2/1998 | Hutchinson, IV et al. . |
| 5,734,674 | 3/1998 | Fenton et al. . |
| 5,734,966 | 3/1998 | Farrer et al. . |
| 5,737,329 | 4/1998 | Horiguchi . |
| 5,739,596 | 4/1998 | Takizawa et al. . |
| 5,749,067 | 5/1998 | Barrett . |
| 5,781,156 | 7/1998 | Krasner . |
| 5,784,695 | 7/1998 | Upton et al. . |
| 5,786,789 | 7/1998 | Janky . |
| 5,812,087 | 9/1998 | Krasner . |
| 5,825,327 | 10/1998 | Krasner . |
| 5,828,694 | 10/1998 | Schipper . |
| 5,831,574 | 11/1998 | Krasner . |
| 5,832,021 | 11/1998 | Kondo . |
| 5,841,396 | 11/1998 | Krasner . |
| 5,845,203 | 12/1998 | LaDue . |
| 5,854,605 | 12/1998 | Gildea . |
| 5,862,465 | 1/1999 | Ou . |
| 5,867,535 | 2/1999 | Phillips et al. . |
| 5,867,795 | 2/1999 | Novis et al. . |
| 5,872,540 | 2/1999 | Casabona et al. . |
| 5,874,914 | 2/1999 | Krasner . |
| 5,877,724 | 3/1999 | Davis . |
| 5,877,725 | 3/1999 | Kalafus . |
| 5,881,371 | 3/1999 | Reynolds . |
| 5,883,594 | 3/1999 | Lau . |
| 5,884,214 | 3/1999 | Krasner . |
| 5,889,474 | 3/1999 | LaDue . |
| 5,903,654 | 5/1999 | Milton et al. . |
| 5,907,809 | 5/1999 | Molnar et al. . |
| 5,909,640 | 6/1999 | Farrer et al. . |
| 5,917,444 | 6/1999 | Loomis et al. . |
| 5,917,829 | 6/1999 | Hertz et al. . |
| 5,920,283 | 7/1999 | Shaheen et al. . |
| 5,923,703 | 7/1999 | Pon et al. . |
| 5,924,024 | 7/1999 | Ikeda et al. . |
| 5,926,131 | 7/1999 | Sakumoto et al. . |
| 5,936,572 | 8/1999 | Loomis et al. . |
| 5,943,363 | 8/1999 | Hanson et al. . |
| 5,945,944 | 8/1999 | Krasner . |
| 5,956,328 | 9/1999 | Sato . |
| 5,963,582 | 10/1999 | Stansell, Jr. . |
| 5,970,084 | 10/1999 | Honda et al. . |
| 5,977,909 | 11/1999 | Harrison et al. . |
| 5,982,324 | 11/1999 | Watters et al. . |
| 5,987,016 | 11/1999 | He . |
| 5,991,309 | 11/1999 | Jensen et al. . |
| 5,991,613 | 11/1999 | Euscher et al. . |
| 5,995,537 | 11/1999 | Kondo . |
| 5,999,124 | 12/1999 | Sheynblat . |
| 6,002,362 | 12/1999 | Gudat . |
| 6,002,363 | 12/1999 | Krasner . |
| 6,002,709 | 12/1999 | Hendrickson . |
| 6,009,551 | 12/1999 | Sheynblat . |
| 6,016,119 | 1/2000 | Krasner . |
| 6,023,462 | 2/2000 | Nieczyporowicz et al. . |
| 6,041,222 | 2/2000 | Horton et al. . |
| 6,047,016 | 4/2000 | Ramberg et al. . |
| 6,047,017 | 4/2000 | Cahn et al. . |
| 6,049,715 | 4/2000 | Willhoff et al. . |
| 6,052,081 | 4/2000 | Krasner . |
| 6,061,018 | 5/2000 | Sheynblat . |
| 6,064,336 | 5/2000 | Krasner . |
| 6,064,688 | 5/2000 | Yanagi . |
| 6,075,809 | 6/2000 | Naruse . |
| 6,104,338 | 8/2000 | Krasner . |
| 6,104,340 | 8/2000 | Krasner . |
| 6,107,960 | 8/2000 | Krasner . |
| 6,108,372 * | 8/2000 | Tidemann, Jr. et al. ............ 375/225 |
| 6,111,540 | 8/2000 | Krasner . |
| 6,131,067 | 10/2000 | Girerd et al. . |
| 6,133,871 | 10/2000 | Krasner . |
| 6,133,873 | 10/2000 | Krasner . |
| 6,133,874 | 10/2000 | Krasner . |
| 6,150,980 | 11/2000 | Krasner . |

* cited by examiner

SIGNAL DETECTOR EMPLOYING CORRELATION ANALYSIS OF NON-UNIFORM AND DISJOINT SAMPLE SEGMENTS

BACKGROUND

I. Field of the Invention

This invention relates to the field of signal detection using correlation analysis, and more specifically, to correlation analysis in which the results of analyzing segments of samples separated in time and possibly having non-uniform lengths are combined to achieve a greater effective signal to noise ratio (SNR).

II. Background of the Invention

The Global Positioning System (GPS) is a collection of 24 earth-orbiting satellites. Each of the GPS satellites travels in a precise orbit about 11,000 miles above the earth's surface. A GPS receiver locks onto at least 3 of the satellites, and responsive, thereto, is able to determine its precise location. Each satellite transmits a signal modulated with a unique pseudo-noise (PN) code. Each PN code comprises a sequence of 1023 chips which are repeated every millisecond consistent with a chip rate of 1.023 MHz. Each satellite transmits at the same frequency. For civil applications, the frequency is known as L1 and is 1575.42 MHz. The GPS receiver receives a signal which is a mixture of the transmissions of the satellites that are visible to the receiver. The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then used the shifted PN code to achieve synchronization with subsequent transmissions from the satellite.

The receiver determines its distance from the satellite by determining the code phase of the transmission from the satellite. The code phase (CP) is the delay, in terms of chips or fractions of chips, that a satellite transmission experiences as it travels the approximately 11,000 mile distance from the satellite to the receiver. The receiver determines the code phase for a particular satellite by correlating shifted versions of the satellite's PN code with the received signal after correction for Doppler shift. The code phase for the satellite is determined to be the shift which maximizes the degree of correlation with the received signal.

The receiver converts the code phase for a satellite to a time delay. It determines the distance to the satellite by multiplying the time delay by the velocity of the transmission from the satellite. The receiver also knows the precise orbits of each of the satellites. The receiver uses this information to define a sphere around the satellite at which the receiver must be located, with the radius of the sphere equal to the distance the receiver has determined from the code phase. The receiver performs this process for at least three satellites. The receiver derives its precise location from the points of intersection between the at least three spheres it has defined.

The Doppler shift (DS) is a frequency shift in the satellite transmission caused by relative movement between the satellite and the receiver along the line-of-sight (LOS). It can be shown that the frequency shift is equal to $$\frac{v_{LOS}}{\lambda},$$

where $v_{LOS}$ is the velocity of the relative movement between the satellite and receiver along the LOS, and $\lambda$ is the wavelength of the transmission. The Doppler shift is positive if the receiver and satellite are moving towards one another along the LOS, and is negative if the receiver and satellite are moving away from one another along the LOS.

The Doppler shift alters the perceived code phase of a satellite transmission from its actual value. Hence, the GPS receiver must correct the satellite transmissions for Doppler shift before it attempts to determine the code phase for the satellite through correlation analysis.

The situation is illustrated in FIG. 1, which shows a GPS receiver 10 and three GPS satellites 12a, 12b, and 12c. Each satellite 12a, 12b, 12c is transmitting to the GPS receiver 10. Satellite 12a is moving towards the GPS receiver 10 along the LOS at a velocity $v_a^+$ 14; satellite 12b is moving away from the GPS receiver 10 along the LOS at a velocity $v_b^-$ 16; and satellite 12c is moving away from the GPS receiver 10 along the LOS at a velocity $v_c^-$ 18. Consequently, assuming a carrier wavelength of $\lambda$, the transmission from satellite 12a will experience a positive Doppler shift of $$\frac{v_a^+}{\lambda};$$

the transmission from satellite 12b will experience a negative Doppler shift of $$\frac{v_b^-}{\lambda};$$

the transmission from satellite 12c will experience a negative Doppler shift of $$\frac{v_c^-}{\lambda}.$$

The GPS receiver functions by sampling a finite portion of the received signal 20 and then processing the samples. Typically, external constraints limit the size and occurrence of the sampling period. For example, in the case of a mobile wireless phone integrated with a GPS receiver, the sampling window should be limited to those periods in which the phone is not transmitting. The purpose is to avoid interference between the satellite transmitter and the GPS receiver 10.

The problem is that the signal to noise ratio of the received signal 20 over a finite sampling window may not be sufficient to detect the presence and range of the satellite transmitters. For example, the signal may be such that there is no correlation value for a particular set of hypotheses which is significantly larger than the correlation values resulting from the other hypotheses tested.

Moreover, it is difficult to combine segments of samples captured over different periods of time because each is subject to a different code phase which must be accounted for before the segments can be combined, and these code phases are unknown. In an effort to increase the signal to noise ratio of the received signal, prior art receivers are thus required to either forgo operation during times in which the received signal is weak, or to extend the sampling period beyond the limits imposed by external constraints. In certain applications, such as the case of a GPS receiver integrated with a mobile wireless phone, extension of the sampling window is not usually feasible since it would subject the received signal to unacceptable interference from the phone's transmitter. In such applications, the practical effect is to forego operation of the GPS receiver when the received signal is weak. Such occurrences are frequent because of the approximately 11,000 mile distance traveled by the GPS satellite transmissions, and because of the noise to a particular satellite represented by the other satellite's transmissions.

Consequently, there is a need for a signal detector which overcomes the disadvantages of the prior art. Similarly, there is a need for a GPS receiver 10 which overcomes the disadvantages of the prior art.

RELATED APPLICATIONS

This application is related to U.S. patent application Ser. No. 09/145,055, filed Sep. 1, 1998, and entitled "DOPPLER CORRECTED SPREAD SPECTRUM MATCHED FILTER," and now U.S. Pat. No. 6,044,105, U.S. patent application Ser. No. 09/281,566, filed on even data herewith, and entitled "SIGNAL DETECTOR EMPLOYING COHERENT INTEGRATION," both of which are owned in common by the assignee hereof, and both of which are hereby fully incorporated by reference herein as though set forth in full.

SUMMARY OF THE INVENTION

Figure 1:
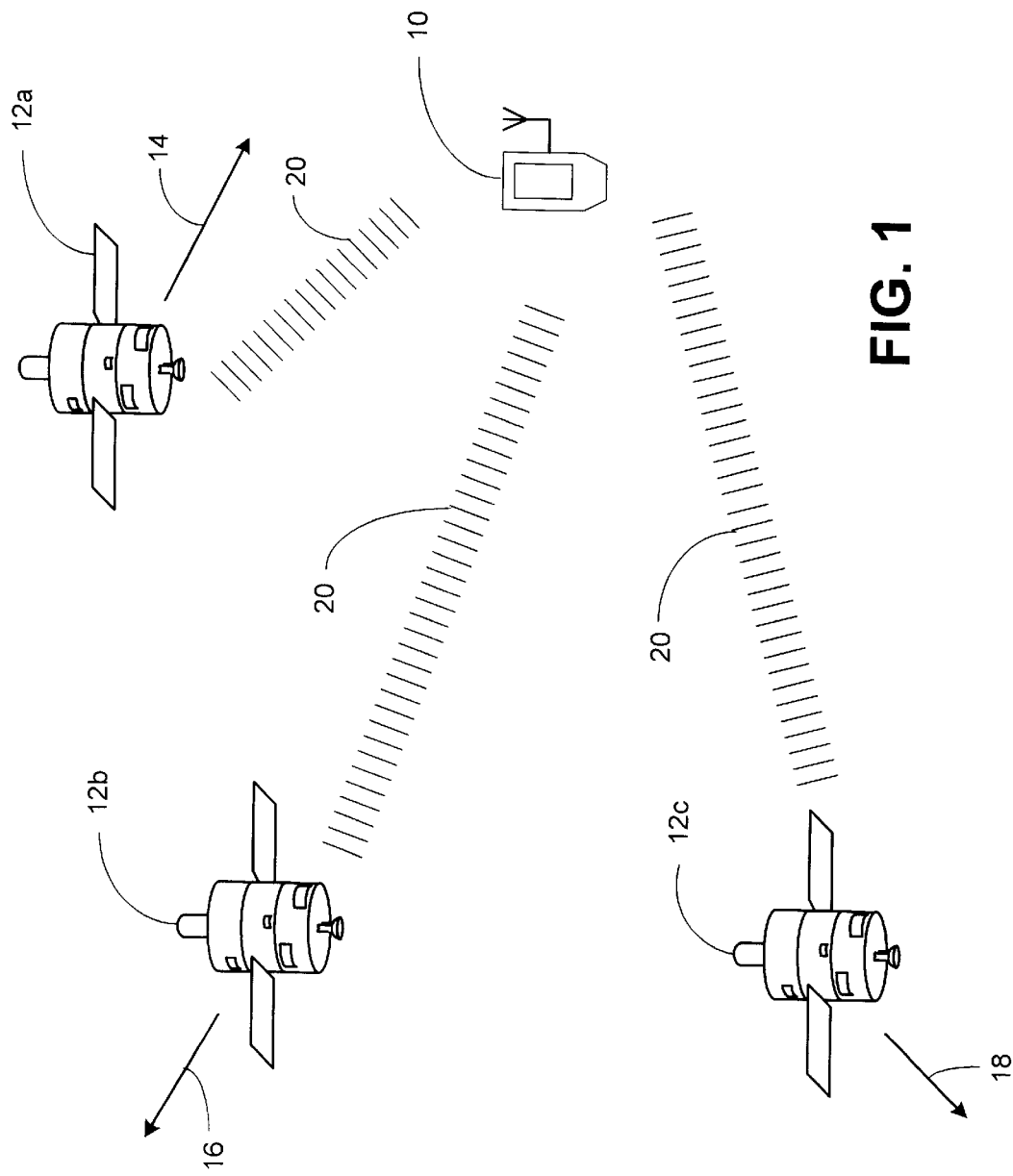
FIG. 1 illustrates an example environment for operation of a GPS receiver.

In accordance with the purpose of the invention as broadly described herein, there is provided a signal detector configured to combine the results of performing correlation analysis on segments of samples of the received signal that may have non-uniform lengths and that may have been obtained over different and non-overlapping periods of time. In one embodiment, the segments are obtained during sampling windows of arbitrary length and at arbitrary times, and the results of processing the segments are successively combined until a threshold signal to noise ratio has been achieved.

In one embodiment, the signal detector is part of a GPS receiver. In this embodiment, the GPS receiver comprises a radio frequency (RF) receiver, sampling circuitry, timing circuitry, offset measurement circuitry, a PN code generator, a matched filter, and a GPS processor. The RF receiver demodulates the received signal to obtain a baseband signal. The sampling circuitry provides, responsive to timing signals produced by the timing circuitry, a segment of samples of the baseband signal taken over a defined sampling window. The matched filter processes the segment of samples in accordance with a plurality of PN code, Doppler shift, and code phase hypotheses.

In one implementation, for each segment of samples, the matched filter outputs correlation data derived by correlating various combinations of PN code, Doppler shift and code phase hypotheses with the segment of samples. According to this implementation, the correlation data can be grouped into groupings which correspond to various combinations of specific hypotheses and ranges of hypotheses. In one implementation example, the correlation data comprises a plurality of arrays, wherein each array corresponds to a PN code hypothesis, each row of an array corresponds to a Doppler shift hypothesis, each column of an array corresponds to a code phase hypothesis, and each entry in the array is a measure of the degree to which the combined PN code, Doppler shift, and code phase hypothesis corresponding to the entry correlates to the samples.

The PN code generator generates the PN code hypotheses which are provided as inputs to the matched filter. In one embodiment, the Doppler shift hypotheses are generated internally within the matched filter. The GPS processor sends out data capture commands to the sampling circuitry and the matched filter directs the sampling circuitry to capture a segment of samples, and directs the matched filter to process the segment of samples. The GPS processor also, responsive to timing signals generated locally by the GPS radio receiver, generates frame marks which are input to the offset measurement circuitry. The offset measurement circuitry determines the offset between the time that a data capture command is issued by the GPS processor and the timing of the next frame mark. This information is provided to the GPS processor for use in combining the results of processing different segments of samples.

In one embodiment, cumulative correlation data is maintained. When the correlation data for a new segment of samples is obtained, the new correlation data is combined with the cumulative correlation data. According to this embodiment, the GPS processor accumulates the correlation data for a particular satellite until a threshold signal to noise ratio is achieved. In one implementation, the data for a particular satellite is maintained until the presence and range of the satellite can be determined.

The correlation data for different segments of samples are combined using an algorithm that allows for the differing code phases between the segments to be accounted for even through the actual code phases are unknown. In one embodiment, in which the correlation data for a given segment of samples comprises a plurality of arrays, wherein each array in the plurality corresponds to a particular PN code hypothesis, and each row of an array corresponds to a particular Doppler shift hypothesis, cumulative correlation arrays are initialized with the correlation arrays for the first segment. Then, the correlation arrays for the second segment are combined with the cumulative correlation arrays one array at a time, and within an array, one row at a time. The process continues indefinitely and ceases for a particular satellite (PN code) when the presence and range of the satellite is accurately detected.

The code phase difference corresponding to a row is derived from the total time offset between the start of the first segment and the start of the second segment, and the Doppler shift hypothesis corresponding to the row.

In one implementation example, the code phase difference is determined from the following equation:

$$\Delta CP = [(F_{PN}+D) \times \Delta T] \text{ modulo 1 mS}$$

in which $\Delta CP$ is the code phase difference, $F_{PN}$ is the nominal PN rate of 1.023 MHz, D is the Doppler shift hypothesis corresponding to the array, and $\Delta T$ is the time offset between the beginning of the sampling period for the first segment, and that for the second segment. The value of 1 mS is the period of the PN codes. Since the codes are periodic, the code phase difference of interest is the fractional part of the code period. This is reflected in the foregoing equation through the modulo 1 mS operation.

In this implementation example, the first and second segments each span at least a frame, and begin at a time which is offset from a frame mark. The offsets for the first and second segment, $OS_1$ and $OS_2$, respectively, are each determined from the offset measurement circuitry. According to the implementation example, the offsets are used to determine $\Delta T$ in the foregoing equation as follows:

$$\Delta T = (T_n - T_2 + OS_1 - OS_2) \times S$$

In this latter equation, $T_n$ is the timing of the frame mark which occurs at the beginning of the second segment, and from which $OS_2$ is defined. Similarly, $T_2$ is the timing of the frame mark which occurs at the beginning of the first segment, and from which $OS_1$ is defined. The variable S is the error in the local time base generated by a local crystal oscillator in the GPS receiver in relation to the time base defined at the GPS satellites. The GPS receiver determines this error and corrects for it in the foregoing equation.

This code phase difference is then used to combine the rows for the correlation arrays. In the implementation example, the row of correlation data for the second segment is circularly shifted by the code phase difference. Then, the shifted row is added to the corresponding row of cumulative correlation data, one data element at a time. This process is then repeated for each of the rows of each of the arrays for the second segment. The result is a plurality of cumulative correlation arrays which combine the results of the first and second segments.

The correlation arrays for additional segments are combined with the cumulative correlation arrays in the foregoing manner. For a given satellite, the process of combining segments continues until the signal to noise ratio is sufficient to permit the presence and range of the satellite to be accurately determined.

Related methods of operation and computer readable media are also provided.

DETAILED DESCRIPTION OF THE PREFERRED EMBODIMENTS

I. Signal Detector Overview

Figure 2:
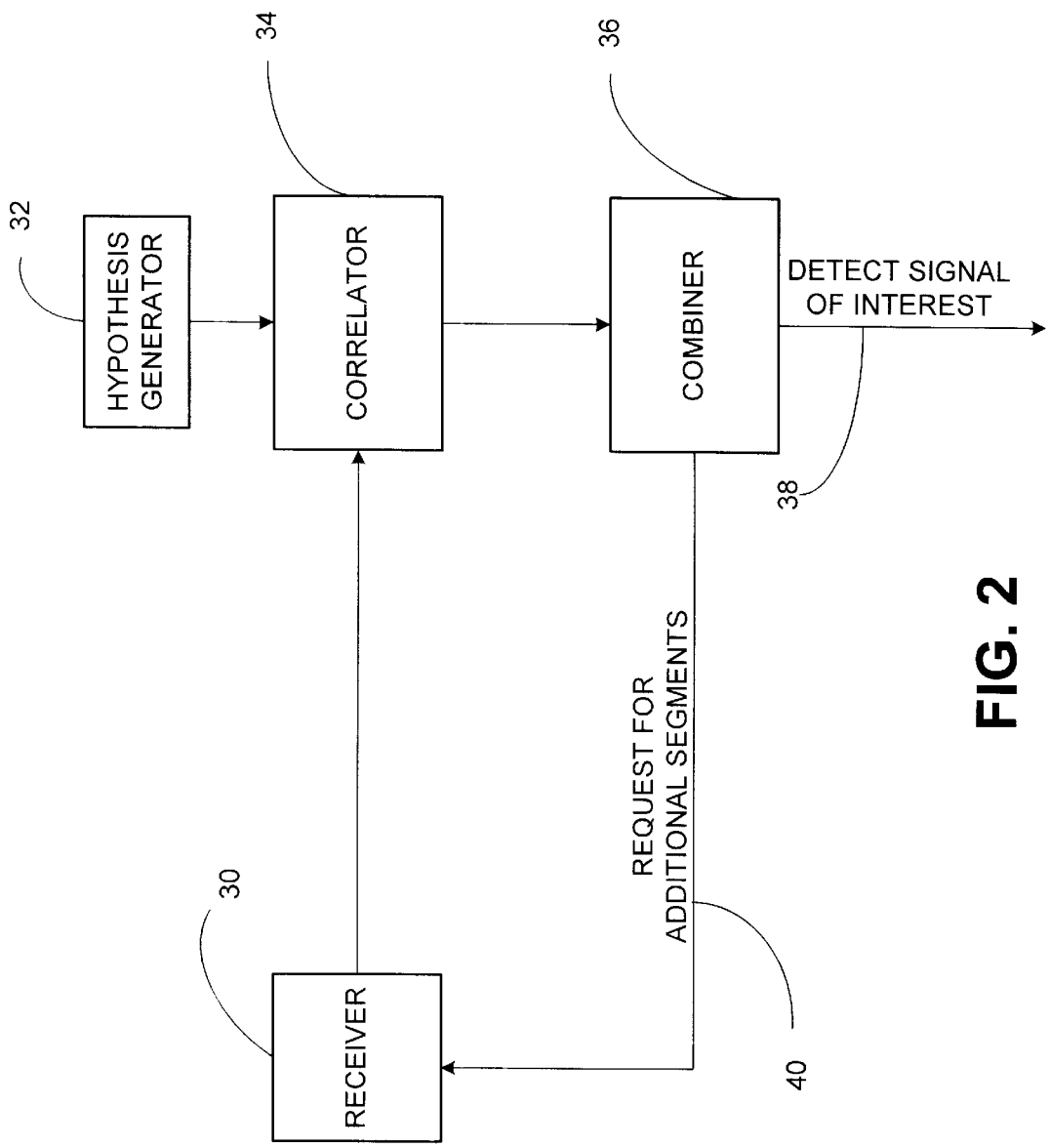
FIG. 2 is a block diagram of an embodiment of a signal detector in accordance with an embodiment of the subject invention.

A block diagram of one embodiment of a signal detector in accordance with the subject invention is illustrated in FIG. 2. As illustrated, the signal detector comprises a receiver 30 configured to receive segments of a signal. The segments may be of nonuniform-length and may be disjoint and separated by arbitrary periods of time. The signal may comprise a signal of interest perturbed by noise. Alternatively, in accordance with a spread spectrum environment, the signal may comprise the combination of multiple signals of interest each encoded using one of a plurality of pseudo-noise (PN) codes. In this case, other signals appear as noise to a particular signal of interest.

A hypothesis generator 32 generates a plurality of hypotheses about the signal of interest. A correlator 34 receives the plurality of hypotheses from hypothesis generator 32, and the segment received by receiver 30, and responsive thereto, generates correlation data representative of the correlation between the received segment and the plurality of generated hypotheses.

The correlation data is provided to combiner 36 which combines the correlation data with cumulative correlation data accumulated for previous segments received by receiver 30. In one embodiment, the combiner 36 first performs an adjustment on the correlation data so that it is combinable with the cumulative correlation data. Once the data has been combined, combiner 36 determines whether the cumulative correlation data is sufficient to permit a parameter of the signal of interest to be detected. If so, an output is provided on signal line 38 signaling detection of the parameter of the signal of interest. If not, a signal is provided to the receiver on signal line 40 indicating the need for additional segments. Optionally, the foregoing process iterates until the parameter of the signal of interest is detected (or a time-out condition is detected).

Figure 3:
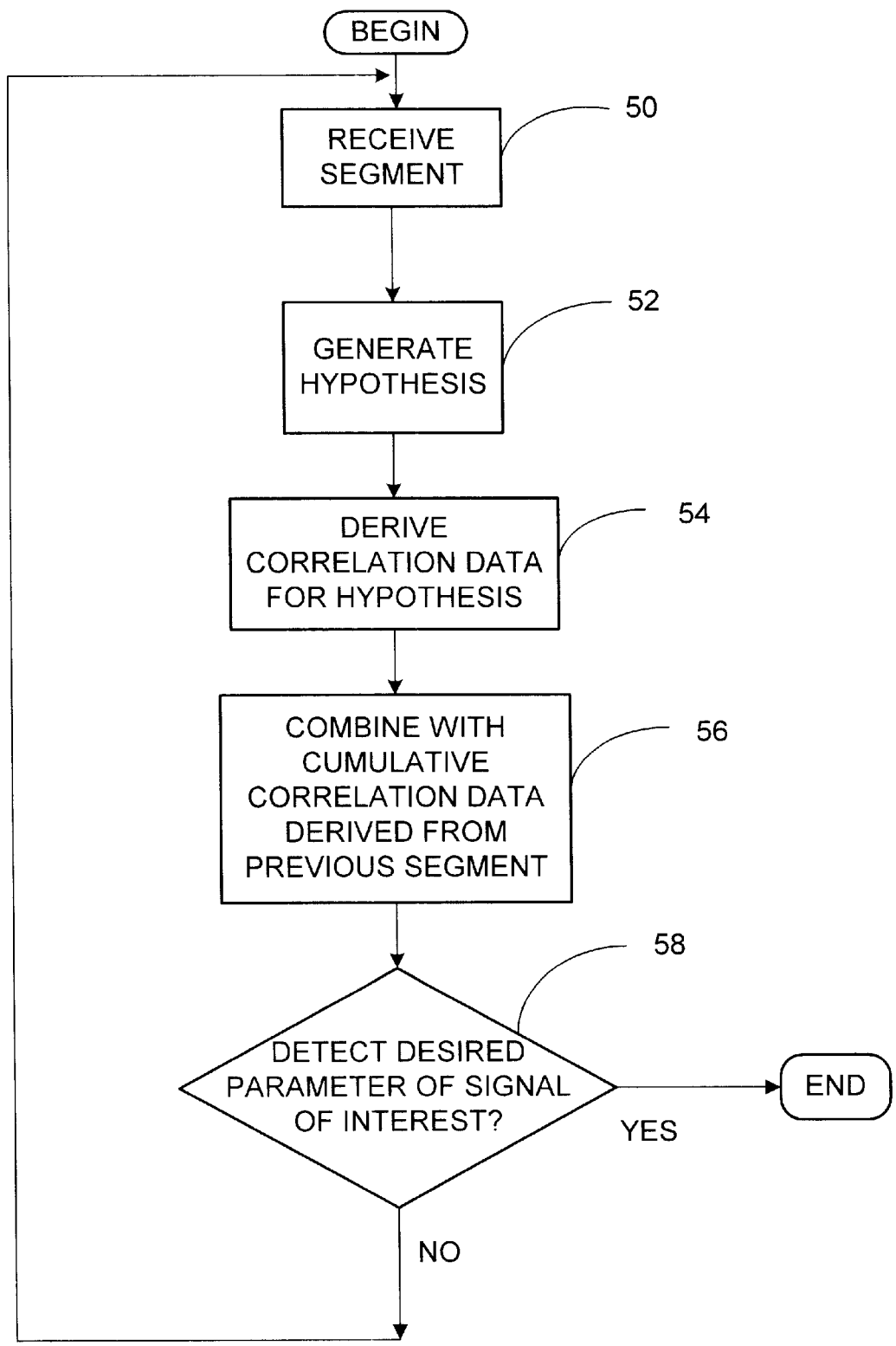
FIG. 3 is a flowchart illustrating an embodiment of a method of operation of the signal detector of FIG. 2.

A flowchart of one embodiment of a method of operation of a signal detector in accordance with the subject invention is illustrated in FIG. 3. As illustrated, the process begins at step 50, in which a segment of the type described earlier is received. Then, in step 52, a plurality of hypotheses are generated for testing. In step 54, correlation data measuring the level of correlation between the received sample and the generated hypotheses is derived.

In step 56, the correlation data from step 54 is combined with cumulative correlation data which may be present from correlation analysis performed on previous segments. In one embodiment, the correlation data from step 54 is first adjusted or altered so that it is combinable with the cumulative correlation data. If no such data is present, the cumulative correlation data is initialized with the correlation data derived in step 54.

In step 58, a determination is made whether the cumulative correlation data permits accurate and reliable detection of a desired parameter of the signal of interest. If so, the process ends. If not, a jump is made to step 50 and the process repeats itself from this point with a new segment. Optionally, the process iterates until the desired parameter of the signal of interest is detected (or a time-out condition occurs).

Figure 4:
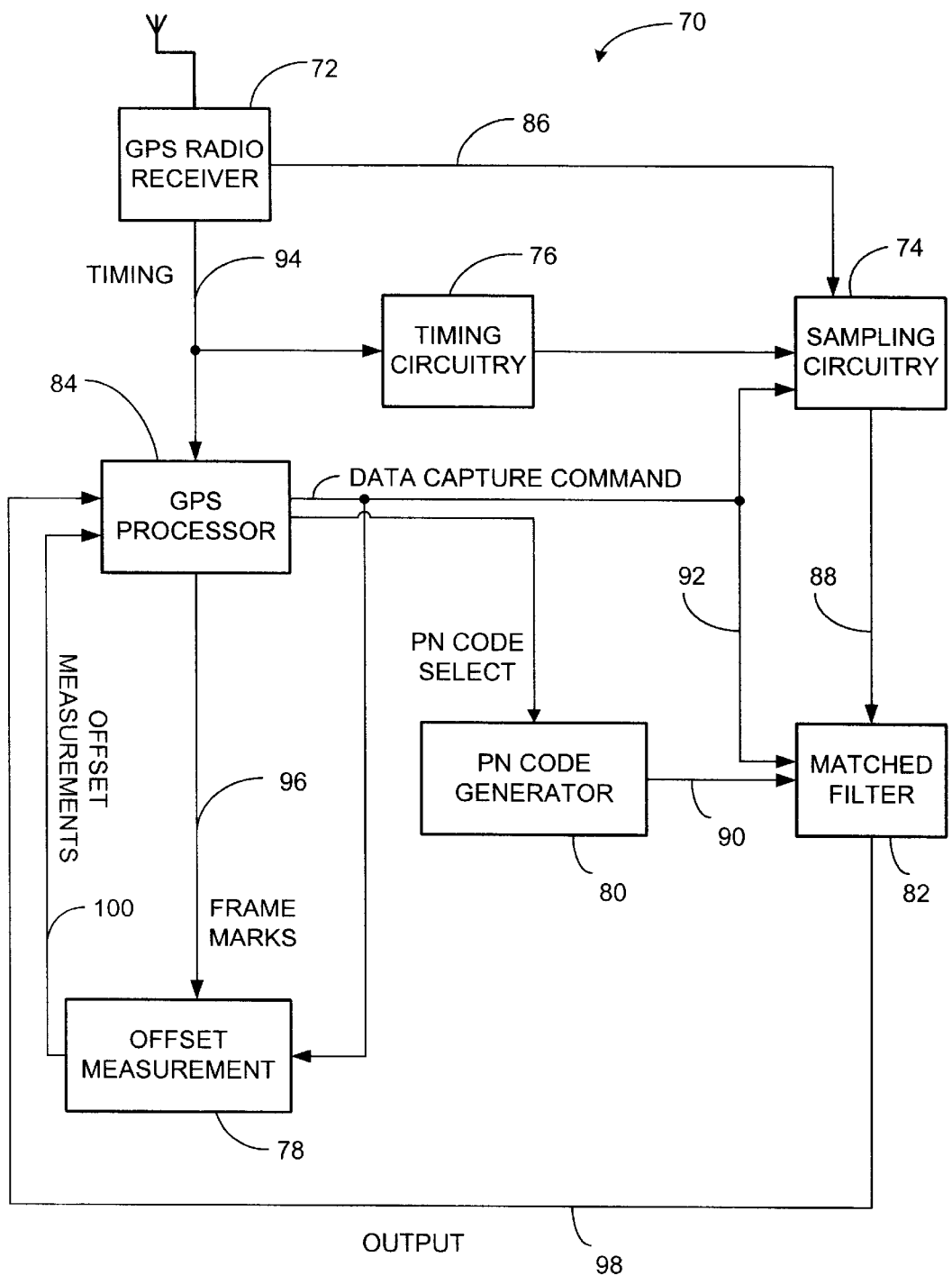
FIG. 4 illustrates an embodiment of a GPS receiver in accordance with the subject invention.

It is contemplated that the foregoing signal detector can be beneficially employed in a variety of applications, such as in a GPS receiver 70. One embodiment of a GPS receiver 70 in accordance with the subject invention is illustrated in FIG. 4. As shown, the receiver 70 comprises a radio frequency (RF) receiver 72, sampling circuitry 74, timing circuitry 76, offset measurement circuitry 78, a PN code generator 80, a matched filter 82, and a GPS processor 84. The RF receiver section 72 demodulates the received signal to obtain a baseband signal which is provided to the sampling circuitry 74 over signal line 86. The sampling circuitry 74 provides, responsive to timing signals produced by the timing circuitry 76, a segment of samples of the baseband signal taken over a defined sampling window. The segment of samples is provided to the matched filter 82 over signal line 88. The matched filter 82 processes the segment of samples in accordance with a plurality of PN code, Doppler shift, and code phase hypotheses.

Figure 5:
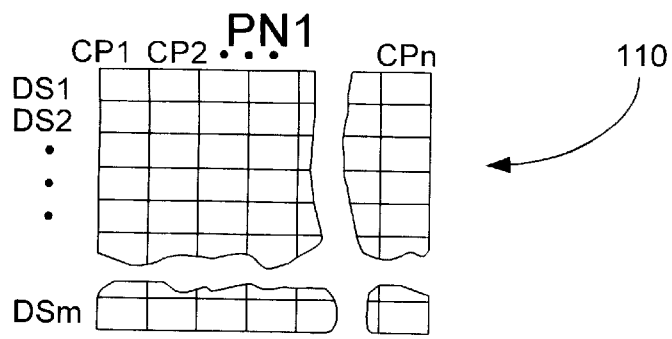
FIG. 5 illustrates the data structures output by one embodiment of a matched filter in accordance with the subject invention.
Figure 5:
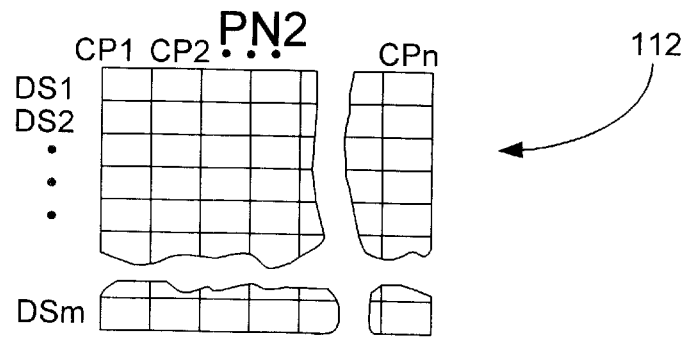
Figure 5:
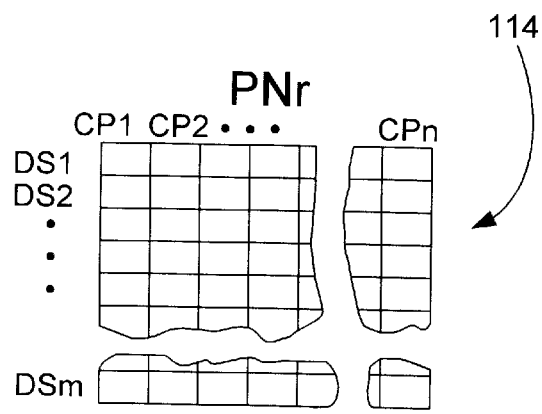

In one implementation, as illustrated in FIG. 5, for each segment of samples, the matched filter outputs a plurality of correlation arrays 110, 112, 114 of data derived from the segment of samples. According to this implementation, each array 110, 112, 114 corresponds to a PN code hypothesis, PN1, PN2, . . . PNr, each row of an array 110, 112, 114 corresponds to a Doppler shift hypothesis, DS1, DS2, . . . DSm, each column of an array 110, 112, 114 corresponds to a code phase hypothesis, CP1, CP2, . . . CPn, and each entry in an array 110, 112, 114 is a measure of the degree to which the combined PN code, Doppler shift, and code phase hypothesis corresponding to the entry correlates to the samples. Thus, in FIG. 5, correlation array 110 corresponds to PN code hypothesis PN1; correlation array 112 corresponds to PN code hypothesis PN2; and correlation array 114 corresponds to PN code hypothesis PNr.

Returning now to FIG. 4, the PN code generator 80 generates the PN code hypotheses which are provided as inputs to the matched filter 82 over signal line 90. In one embodiment, the Doppler shift hypotheses are generated internally within the matched filter. The GPS processor 84 issues data capture commands on signal line 92 to the sampling circuitry 74 and the matched filter 82 directs the sampling circuitry 74 to capture a segment of samples, and directs the matched filter 82 to process the segment of samples. The GPS processor 84 also, responsive to timing signals generated locally by the GPS radio receiver 72 and received over signal line 94, generates frame marks which are input to the offset measurement circuitry 78 over signal line 96. In one implementation, the timing signals generated by the GPS radio receiver 72 are generated by a local oscillator within the RF receiver. In one implementation, the timing signals define a local time base which is related to the time base maintained by the GPS satellites.

II. Correlation Process

The offset measurement circuitry 78 determines the offset between the time that a data capture command is issued by the GPS processor and the time of the next frame mark. This information is provided to the GPS processor 84 for use in combining, in a manner to be described subsequently, the results of processing different segments of samples.

In one embodiment, the correlation arrays for a segment are grouped by PN code hypothesis, and by Doppler shift hypothesis for a given PN code hypothesis. The result is that each grouping corresponds to a particular combination of PN code hypothesis and Doppler shift hypothesis. In this embodiment, the correlation arrays are combined one grouping at a time. According to this implementation, the GPS processor 84 receives these groupings over signal line 98, and cumulatively combines these correlation arrays as additional segments are captured. For a particular satellite, the combination process continues until a threshold signal to noise ratio is obtained for the satellite. In one implementation example, the correlation arrays corresponding to a satellite are combined until the presence and range of the satellite can be accurately determined. Typically, this occurs when the correlation data for a particular set of hypotheses is significantly greater than the correlation data for alternative hypotheses.

The correlation arrays derived from different segments of samples are combined using an algorithm that accounts for the differing code phases between the segments even though the actual code phases are unknown. In one embodiment, a plurality of cumulative correlation arrays are maintained, which are initially set equal to the correlation arrays derived from a first segment of samples. The correlation arrays for a second segment of samples are then combined with the cumulative correlation arrays one row at a time. According to this embodiment, the code phase difference corresponding to a row is derived from the total time offset between the start of the first segment and the start of the second segment, and the Doppler shift hypothesis corresponding to the row. A circular shift of the row for the second segment is then performed, with the amount of the shift being derived from the code phase difference which has been determined. The entries in the shifted row are then added to the corresponding entries of the corresponding row in the cumulative arrays.

The foregoing combining process is then repeated for additional data in the correlation arrays for the second segment. In one implementation, the process is repeated for each of the rows in each of the arrays remaining in the correlation data for the second segment. Moreover, once the data for the second segment has been exhausted, the data for additional segments is combined with the cumulative arrays in the foregoing manner until, for a given satellite, the signal to noise ratio is sufficient to permit the presence and range of the satellite to be accurately determined.

Figure 6:
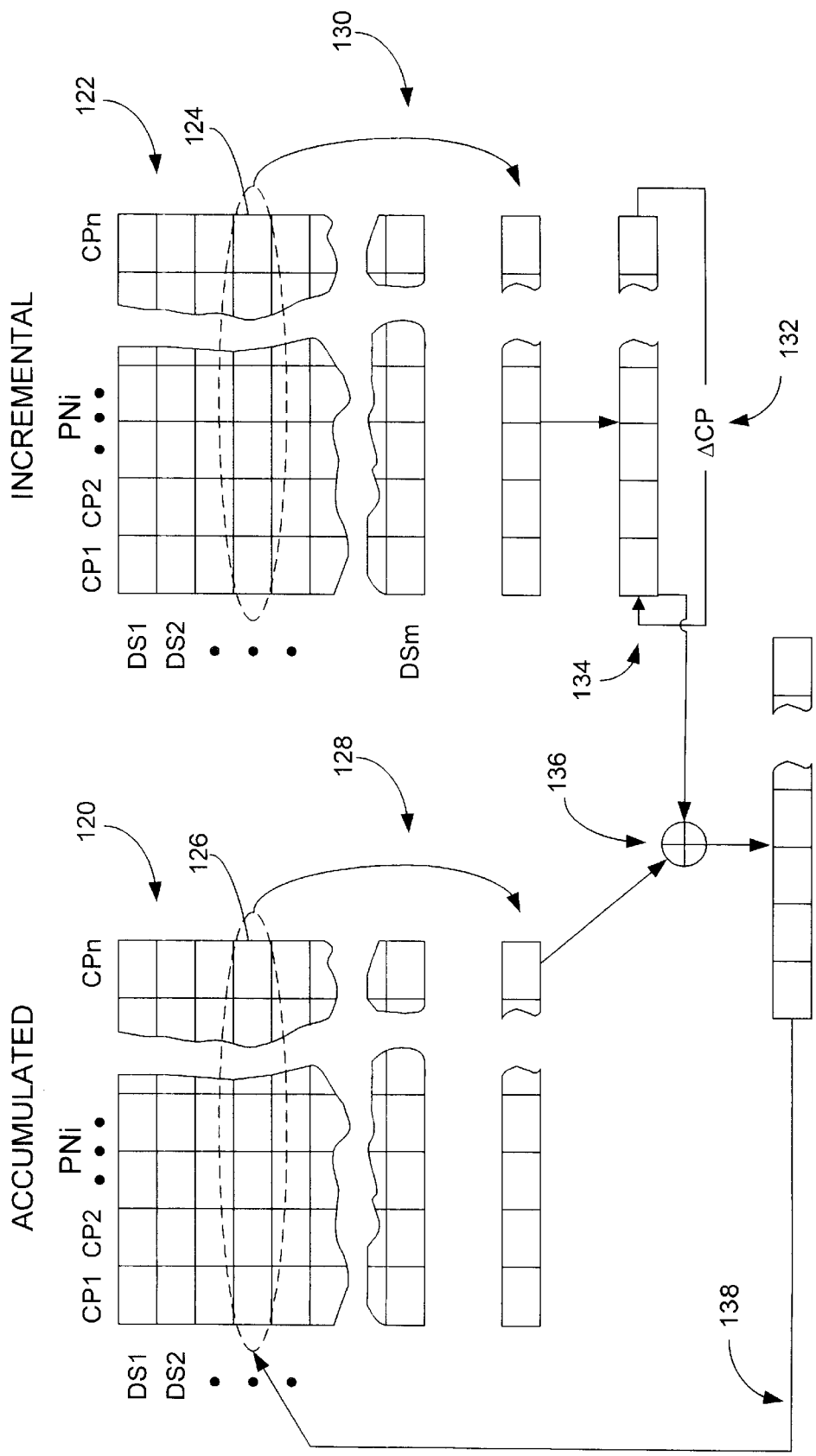
FIG. 6 illustrates data flows in one embodiment of a GPS receiver in accordance with the subject invention.

The situation is illustrated in FIG. 6. Numeral 120 identifies one of the arrays in the plurality of cumulative correlation arrays which are maintained. The particular array which is identified is the one corresponding to PN code hypothesis PNi. These arrays are assumed to have been initially set equal to the correlation arrays derived from a first segment of samples. Numeral 122 identifies the corresponding one of the arrays in the plurality of correlation arrays which are derived from a second set of samples. Again, this array corresponds to the PN code hypothesis PNi. In one implementation, the first segment of samples is obtained during a first time period, and the second set of samples is obtained during a subsequent non-consecutive time period.

The row 124 from array 122 is combined with the row 126 from array 120 in the manner shown. Both rows are assumed to correspond to the same Doppler shift hypothesis, DPi. Row 126 is obtained as indicated by identifying numeral 128. In addition, row 124 is obtained as indicated by identifying numeral 130. As indicated by identifying numeral 132, the code phase difference, $\Delta CP$, defining the code phase difference between the start of the first and second segments is determined. The row 124 obtained from array 122 is then circularly shifted by an amount derived from $\Delta CP$. Such is indicated by identifying numeral 134. The entries in the shifted row are then added to corresponding entries in row 126. Such is indicated by identifying numeral 136. The result is then stored in array 120 in lieu of row 126. Such is indicated by identifying numeral 138.

III. Code Phase Difference Determination

In one implementation example, the code phase difference is determined from the following equation:

$$\Delta CP = [(F_{PN} + D) \times \Delta T] \text{ modulo } 1 \text{ mS} \tag{1}$$

in which $\Delta CP$ is the code phase difference, $F_{PN}$ is the nominal PN rate of 1.023 MHz, D is the Doppler shift hypothesis corresponding to the row, and ΔT is the time offset between the beginning of the sampling period for the first segment, and that for the second segment. The value of 1 mS is the period of the PN codes. Since the codes are periodic, the code phase difference of interest is the fractional part of the code period. This is reflected in the foregoing equation through the modulo 1 mS operation.

In this implementation example, the first and second segments each span at least a frame, and begin at a time which is offset from a frame mark. The offsets for the first and second segments, $OS_1$ and $OS_2$, respectively, are each determined from the offset measurement circuitry 78 (FIG. 4). According to the implementation example, the offsets are used to determine ΔT in the foregoing equation as follows:

$$\Delta T = (T_n - T_2 + OS_1 - OS_2) \times S \qquad (2)$$

In this latter equation, $T_n$ is the timing of the frame mark which occurs at the beginning of the second segment, and from which $OS_2$ is defined. Similarly, $T_2$ is the timing of the frame mark which occurs at the beginning of the first segment, and from which $OS_1$ is defined. The variable S is the error in the local time base generated by a local crystal oscillator in the GPS radio receiver 72 in relation to the time base defined at the GPS satellites. The GPS receiver determines this error and corrects for it in the foregoing equation.

Figure 7:
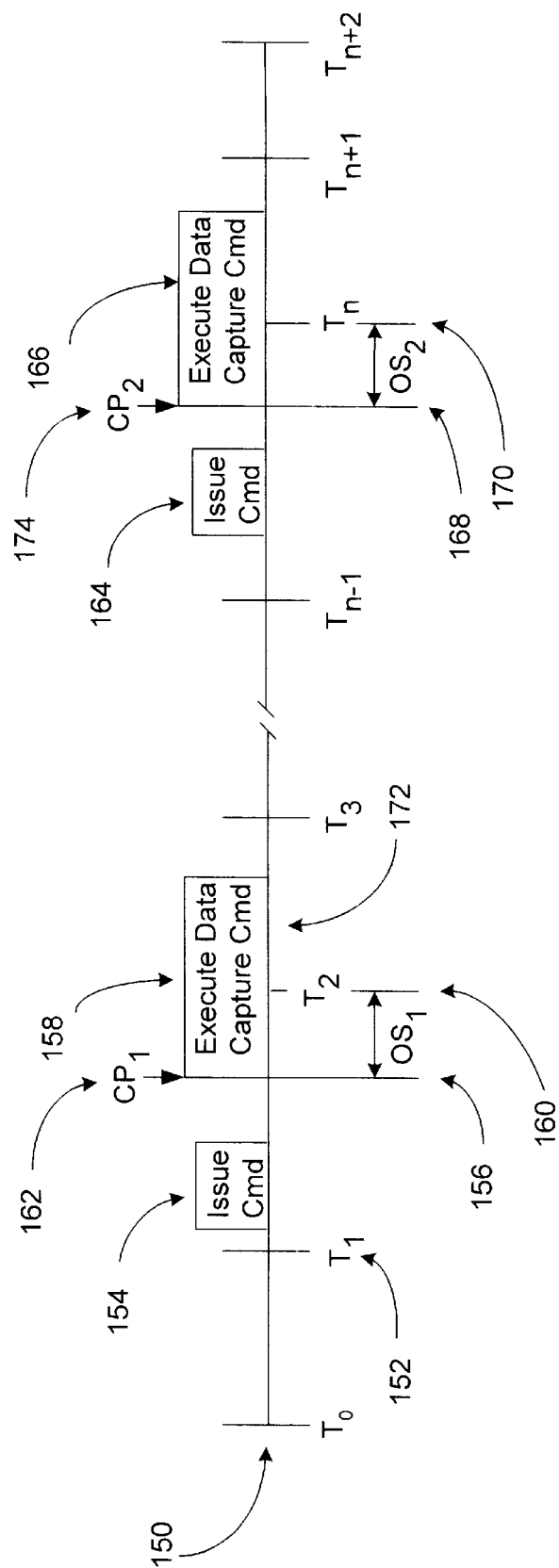
FIG. 7 is a timing diagram for combining multiple correlation arrays in accordance with one implementation of the subject invention.

The situation is illustrated in FIG. 7. Local time base 150 is divided into frames by frame marks $T_1, T_2, \ldots T_n$. In one implementation example, the duration of a frame is 20 mS. Upon detecting the occurrence of frame mark $T_1$, identified in the figure with numeral 152, GPS processor 84 (FIG. 4) issues a command, identified with numeral 154, to capture a first segment of samples. The capture of the first segment of samples begins at time 156, and the segment itself is identified in the figure with numeral 158. As 20 indicated, the first set of samples is assumed to span at least one frame. The offset measurement circuitry 78 (FIG. 4) detects the next occurrence of a frame mark, $T_2$, identified in the figure with numeral 160, and, responsive thereto, determines the offset, $OS_1$, between the time 156 that capture of the segment began, and the time 160 of the frame mark $T_2$.

The segment of samples 158 is typically representative of the combination of transmissions from multiple ones of GPS satellites, each of which has a different code phase as measured at the receiver. In relation to a particular satellite of interest, the segment 158 will have a specific code phase, $CP_1$, which is identified in the figure with numeral 162.

After the occurrence of a number of additional frame marks, $T_3, \ldots T_{n-1}$, the GPS processor 84 (FIG. 4) issues another command to capture a segment of samples. This second command is identified in FIG. 7 with numeral 164, and is assumed to occur after the GPS processor 84 has detected the occurrence of frame mark $T_{n-1}$. The capture of the second segment, which is identified with numeral 166, begins at time 168. Again, the second segment is assumed to span at least one frame. The next frame mark, $T_n$, occurs at time 170. The offset measurement circuitry 78 measures the offset, $OS_2$, between the beginning 168 of the second segment, and the occurrence 170 of the next frame mark $T_n$. This second frame is assumed to have a particular code phase, $CP_2$, which is defined in relation to a particular satellite. The time ΔT in the foregoing equations is the difference in time between the beginning 168 of the second segment, and the beginning 156 of the first segment, and the value ΔCP in the foregoing equations is the difference in code phase between the code phase for the first segment, $CP_1$, and that for the second segment, $CP_2$. Significantly, this value is determined from the foregoing equations even though the underlying code phases $CP_1$ and $CP_2$ are unknown.

IV. Embodiment of a Matched Filter

Figure 8:
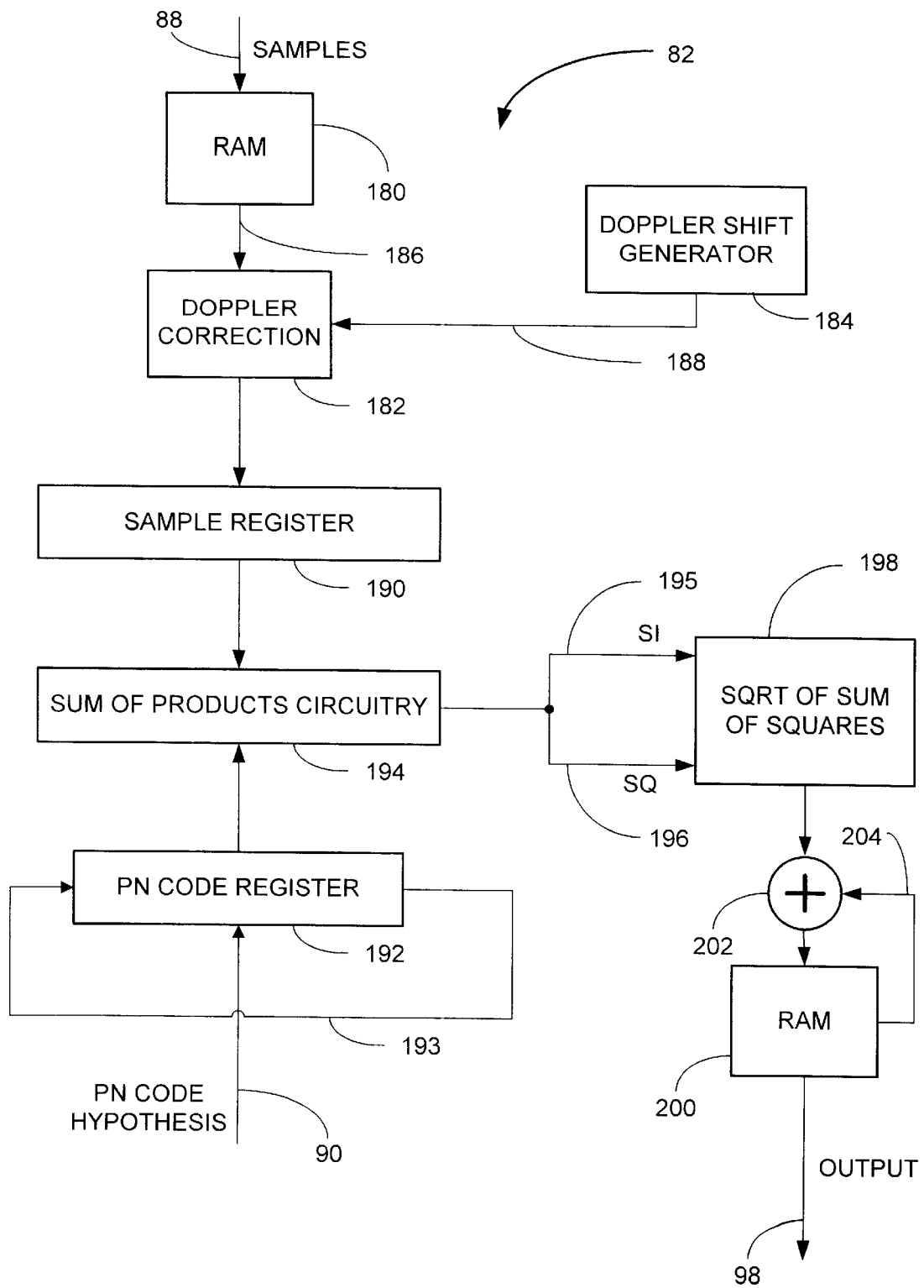
FIG. 8 illustrates an embodiment of a matched filter in accordance with the subject invention.

FIG. 8 illustrates one embodiment of matched filter 82 in FIG. 4. Compared to FIG. 4, like elements in FIG. 8 are referenced with like identifying numerals. As illustrated, this embodiment of the matched filter comprises random access memory (RAM) 180 which is configured to receive samples from sampling circuitry 74 (FIG. 4) over signal line 88. In one implementation example, a frame is 20 mS in duration, and the RAM 180 is configured to receive one 20 mS frame of samples at a time. According to this implementation example, each 20 mS frame of samples comprises 40920 samples, obtained by sampling the baseband signal at a nominal sampling rate of 20.46 MHz, and then performing decimation filtering.

Also provided is Doppler shift correction circuitry 182, and Doppler shift generator 184. The RAM 180 is configured to provide to Doppler shift correction circuitry 182 over signal line 186 at least a portion of a frame of samples stored therein at a time. In one implementation, the frame of samples stored in RAM 180 is divided into subframes, and is provided to Doppler shift correction circuitry 182 one subframe at a time. In one implementation example, the duration of a subframe is equal to the period of the PN codes, which is currently set to 1 mS. In this implementation example, each subframe of samples comprises 2046 samples, with each sample represented as a complex number having an in-phase (I) and a quadrature (Q) component which are typically expressed in combination as I+jQ. According to this implementation example, each component, whether I or Q, is represented by 2 bits, and can take on any one of the discrete values −1, 0, or +1.

Doppler shift generator 184 generates a plurality of Doppler shift hypotheses which are provided to Doppler shift correction circuitry 182 over signal line 188 one hypothesis at a time. In one implementation example, the Doppler shift generator 184 generates Doppler shift hypotheses in the range of ±62,000 Hz, to allow for additional inaccuracy in the local time base that is not corrected by the input sampling process.

Sample register 190 is also provided. Doppler shift correction circuitry 182 receives a subframe of samples from RAM 180 over signal line, and a Doppler shift hypothesis from Doppler shift generator 184, and, responsive thereto, generates a corrected subframe of samples which are stored in sample register 190. Additional detail about this procedure is available in U.S. patent application Ser. No. 09/145,055, filed Sep. 1, 1998, entitled "DOPPLER CORRECTED SPREAD SPECTRUM MATCHED FILTER," now U.S. Pat. No. 6,044,105, previously incorporated by reference herein as though set forth in full. In one implementation example, each corrected subframe of samples continues to comprise 2046 complex samples, each having I and Q components. Each of the samples in this implementation example can take on any one of the discrete values −2, −1, 0, +1, and +2, which are represented by 3 bits for each of I and Q.

PN code register 192 is provided to store the current PN code hypothesis provided by PN code generator 80 (FIG. 4) over signal line 90. In one implementation, each PN code hypothesis represents one period of a PN code. In one implementation example, the PN code period is 1 mS, and each PN code hypothesis represents 1023 chips which repeats every 1 mS, representing a chip rate of 1.023 MHz. In this implementation example, the PN code register is configured to store 1023 chips at a time.

As indicated by signal line 193, the PN code register is capable of being circularly shifted by an amount which corresponds to a code phase delay hypothesis. In the implementation example which has been discussed, in which the period of a PN code is 1023 chips, the value of the code phase delay can range from 0 to 2045 half chip increments. The PN code register is configured in this implementation example to be circularly shifted by any number or fraction of chips which correspond to a code phase delay hypothesis under consideration.

Sum of products circuitry 194 is also provided. This circuitry is configured to form the integration of the product between the subframe of corrected samples stored in sample register 190 and the PN code hypothesis stored in the PN code register 192.

In the implementation example discussed earlier in which the subframe of samples stored in sample register 190 comprises 2046 samples, each having I and Q components, and the PN code hypothesis stored in PN code register 192 comprises 1023 chips, a correspondence is present between two of the samples in the sample register 190, and one of the chips in PN code register 192. The I and the Q components of each of the two samples is multiplied by the corresponding PN chip. Then, the sum of the I component products is determined, and the sum of the Q component products is separately determined. The sum of the I component products is output on signal line 195, and the sum of the Q component products is output on signal line 196.

In equation form, the function of the sum of products circuitry 194 in this implementation example can be represented as follows:

$$SI = \sum_{i=1}^{1023} CHIP_i \times (I_i^1 + I_i^2) \quad (3)$$

$$SQ = \sum_{i=1}^{1023} CHIP_i \times (Q_i^1 + Q_i^2) \quad (4)$$

where $CHIP_i$ is the ith chip in the PN code hypothesis, $I_i^1$ is the I component of the first of the two samples corresponding to $CHIP_i$, $I_i^2$ is the I component of the second of the two samples corresponding to $CHIP_i$, $Q_i^1$ is the Q component of the first of the two samples corresponding to $CHIP_i$, and $Q_i^2$ is the Q component of the second of the two samples corresponding to $CHIP_1$.

Sqrt. of sum of squares circuitry 198, adder 202, and RAM 200 are also provided. The sqrt. of sum of squares circuit 198 is configured to receive the sum of the I component products (SI) and the sum of the Q component products (SQ) on signal lines 195 and 196 respectively, and to determine the square root of the sum of the squares of these two values. In equation form, the circuit computes the value:

$$SS=\sqrt{(SI)^2+(SQ)^2}. \quad (5)$$

If the subframe under consideration and stored in sample register 190 is the first subframe for the frame of interest, the foregoing value is stored in an array entry in RAM 200 corresponding to the combination of the PN code, Doppler shift, and code phase hypotheses under consideration. The arrays are of the same format as those depicted in FIG. 5 and will eventually become the correlation arrays for the current PN hypothesis.

If the subframe under consideration and stored in sample register 190 is not the first subframe analyzed for the frame of interest, there may already be a value derived from a previous subframe stored in RAM 200 in the entry corresponding to the combination of the PN code, Doppler shift, and code phase hypotheses under consideration. In this case, the SS value determined above is added by adder 202 with the previously stored value which is provided to the adder 202 over signal line 204. The result is then stored in lieu of the previously stored value in the array entry corresponding to the combined PN code, Doppler shift, and code phase hypotheses.

The next code phase hypothesis is then selected, and the PN code register 192 circularly shifted in accordance with the selected code phase hypothesis. The foregoing process is then repeated. This process continues for each of the code phase hypotheses which are desired to be tested. In one implementation, 2046 code phases are tested for each 1 mS subframe, corresponding to the repetition period of the PN codes. In this implementation, the code phase hypotheses which are tested range from 0 to 2045 half-chip increments, and the next code phase hypothesis is selected simply by circularly shifting the PN code register 192 by one-half chip.

The matched filter of FIG. 8 is configured to perform the foregoing tasks for each of the subframes of the frame stored in the RAM 180. When this process has been completed, correlation arrays of the form shown in FIG. 5 are present in RAM 200. These correlation arrays are provided to the GPS processor 84 (FIG. 4) over signal line 98. GPS processor 84 combines these correlation arrays with correlation arrays derived from a previous segment in the manner described previously.

V. Method of Operation for a First Embodiment

Figure 9:
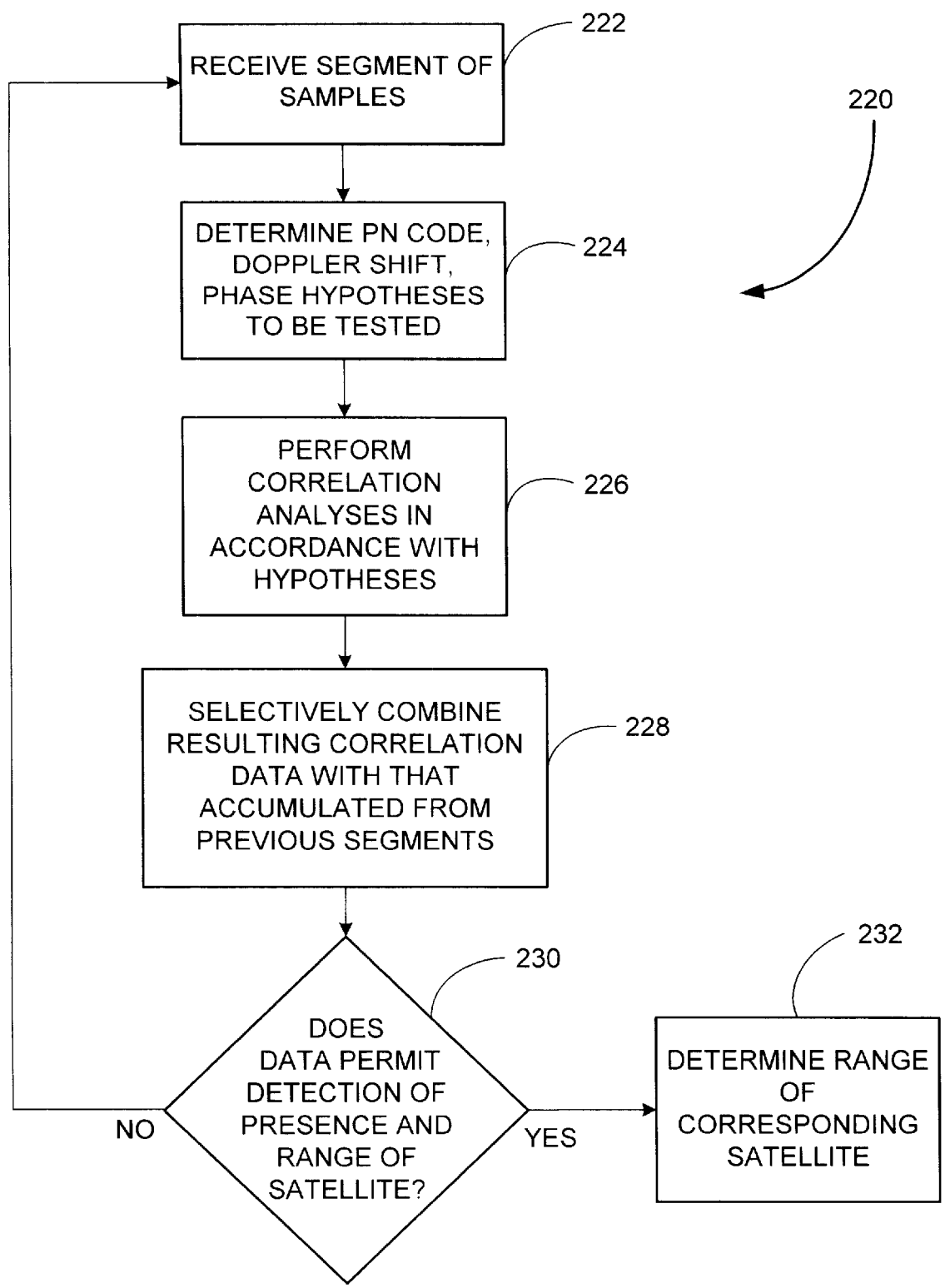
FIG. 9 illustrates an embodiment of a method of operation of a GPS receiver in accordance with the subject invention.

A first embodiment of an overall method of operation of the subject invention is illustrated in FIG. 9. As illustrated, the process 220 is iterative, and each cycle of the process 220 begins at step 222. There, a segment of samples is received. In one embodiment, the segment size is variable from cycle to cycle. In another embodiment, the segment size is fixed. In one implementation example, the segment size is 20 mS.

In step 224, the PN code, Doppler shift, and code phase hypotheses to be tested are determined. In one embodiment, these hypotheses are variable from cycle to cycle. In another embodiment, these hypotheses are fixed. In one implementation, the PN code hypotheses to be tested are determined responsive to the satellites which have already been successfully detected. If a satellite has previously been successfully detected, then its PN code is removed from the set of PN code hypotheses to be tested. Similarly, the set of Doppler shift hypotheses to be tested may be reduced based on the Doppler shift values at which previous satellites have been detected.

In step 226, correlation analyses are performed on the segment of samples in accordance with the set of hypotheses to be tested as determined in step 224. The result is correlation data which measures the level of correlation between various combinations of the tested hypotheses and the segment of samples. In one implementation example, the correlation data is computed using equations (3), (4), and (5) above.

In step 228, this data is selectively combined with correlation data which has been accumulated from previous segments. In one embodiment, this step involves adjusting for the code phase difference between the current segment and the previous segments. In one implementation, this step involves combining correlation arrays row by row after shifting at least one of the rows by the code phase difference which has been determined. In one implementation example, the code phase differences are computed in accordance with equations (1) and (2) above.

In step 230, a determination is made whether the data which has been accumulated permits detection of the presence and range of a satellite. If so, then step 232, in which the range of the satellite is determined, is performed. In one implementation, this step involves determining the range from the code phase hypothesis which has the highest correlation with the samples which have been accumulated. If not, a jump is made back to step 222, whereupon the process 220 repeats itself with a new segment of samples.

VI. Method of Operation for a Second Embodiment

Figure 10A:
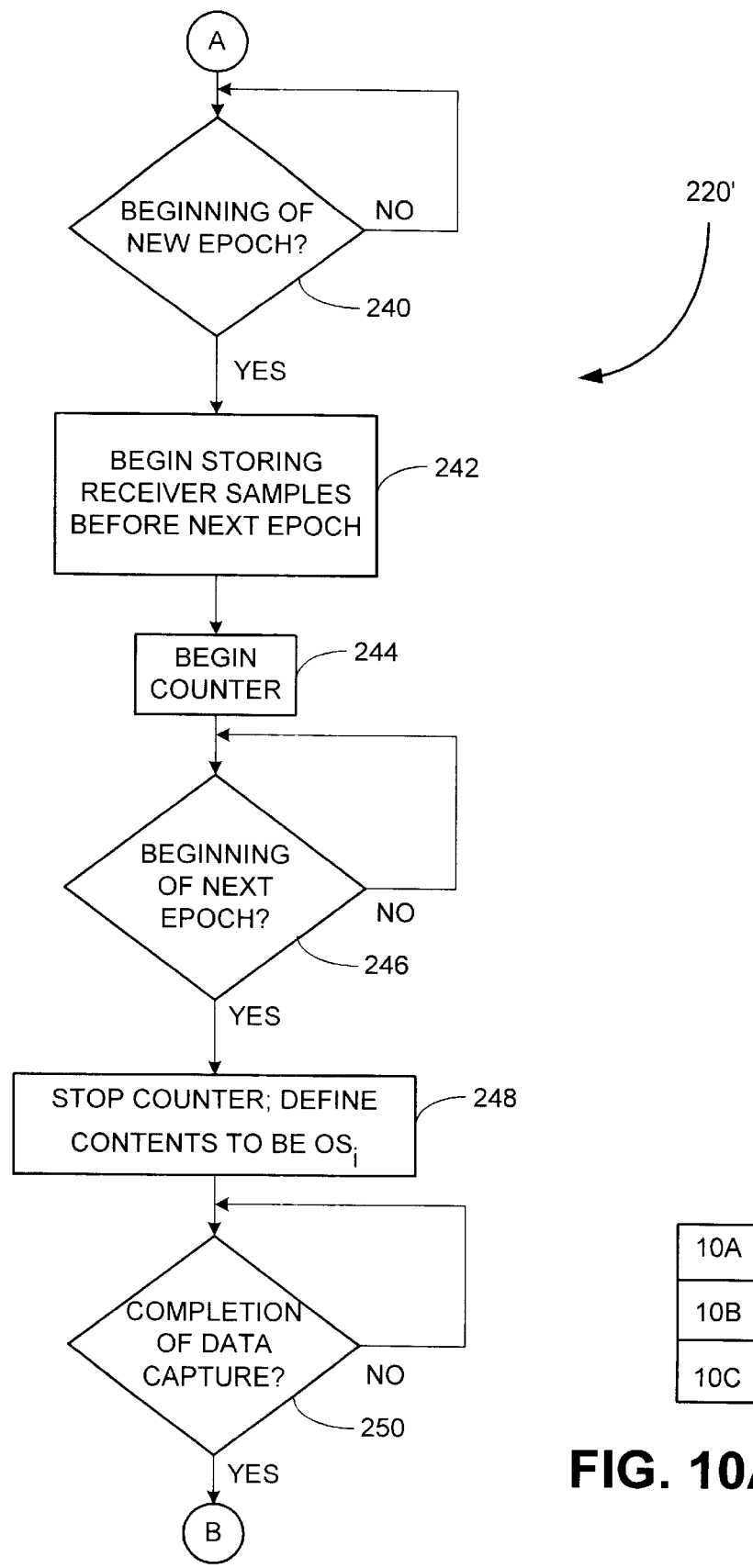
FIGS. 10A–10C illustrate an embodiment of a method of operation of a GPS receiver in accordance with the subject invention.
Figure 10B:
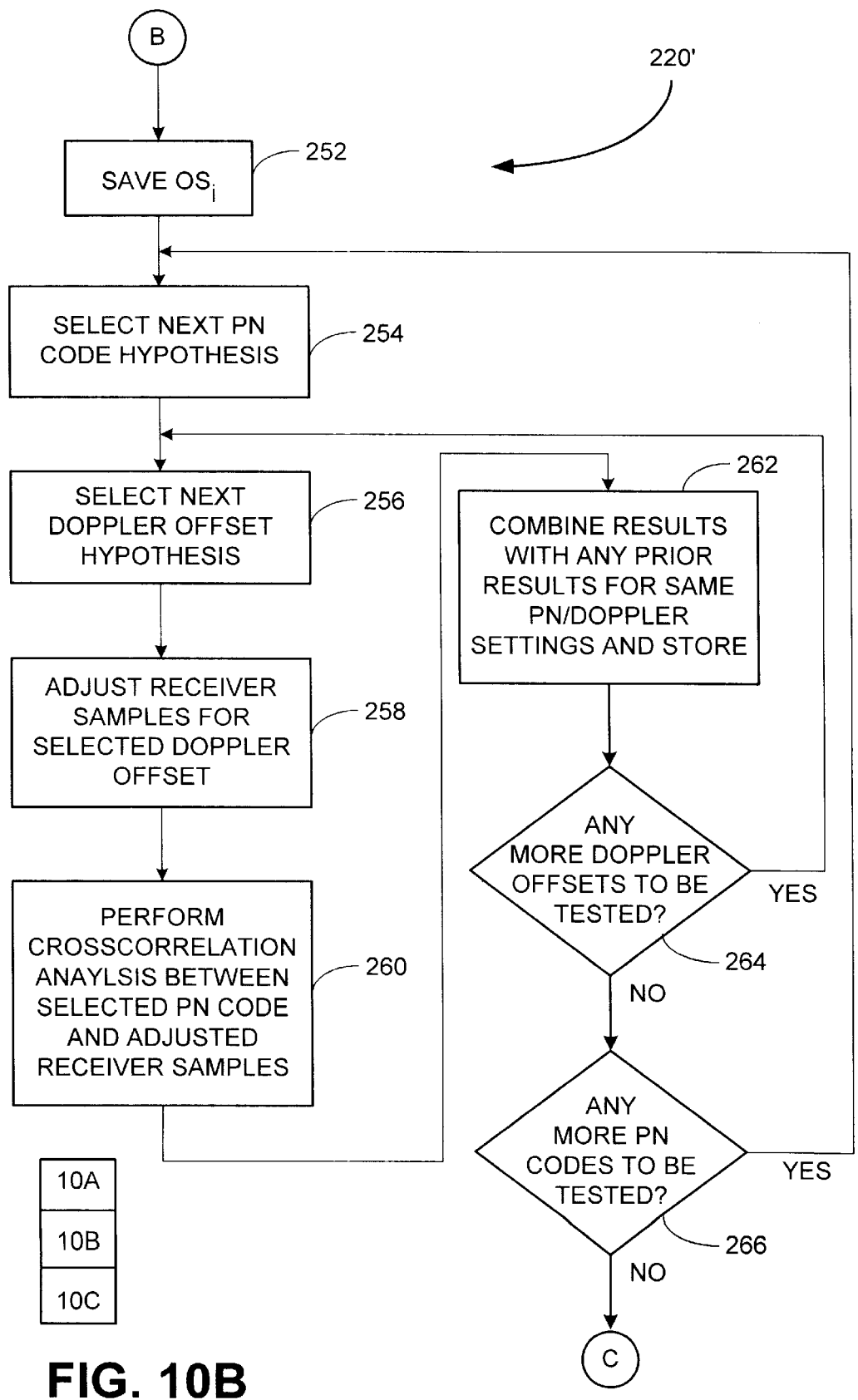
Figure 10C:
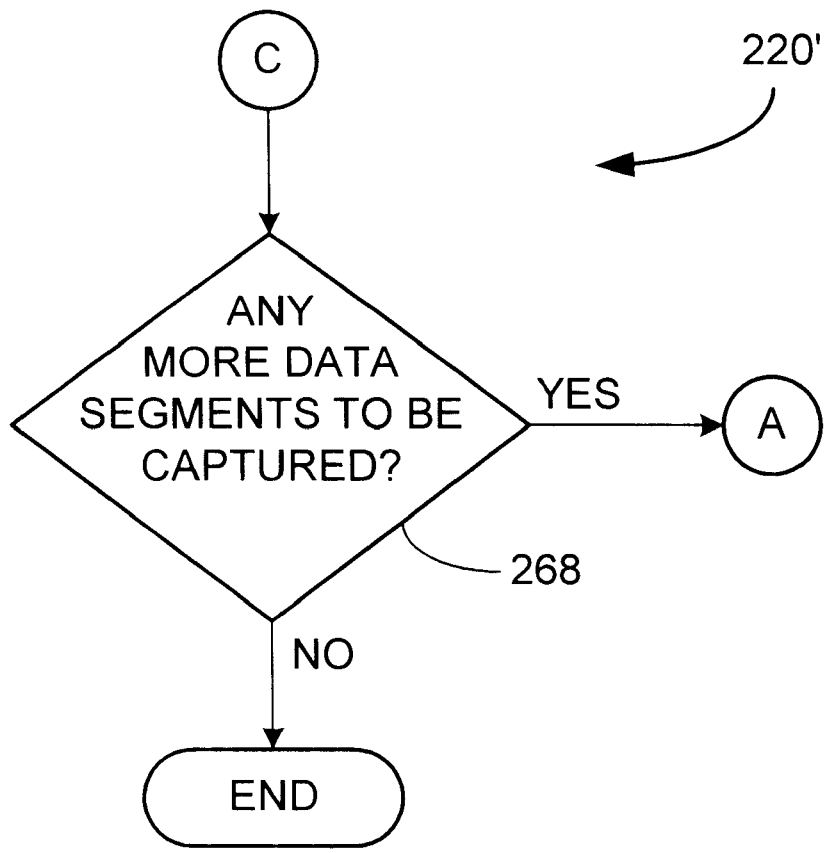
Figure 10C:
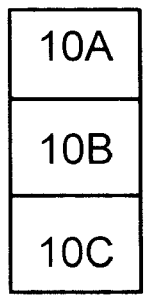

A second embodiment of an overall method of operation of the subject invention is illustrated in FIGS. 10A–10C. Again, the process 220' is iterative, and each cycle of the process begins with step 240. According to this process, it is assumed that a time base exists which is divided up into successive periods known as epochs.

In step 240, the process loops until the beginning of an epoch is detected. In one implementation, an epoch is a frame period. In one implementation example, an epoch is a 20 mS frame period. In the implementation which is the subject of the timing diagram of FIG. 7, epochs are the time periods marked by $T_0$, $T_1$, $T_2$, . . . , $T_n$, $T_{n+1}$, etc. In the scenario depicted in FIG. 7, numeral 152 identifies the beginning of a new epoch which is represented by $T_1$.

Once the beginning of an epoch is detected, step 242 is performed. In step 242, the storage of receiver samples is initiated before the commencement of the next epoch. In the scenario depicted in FIG. 7, the initiation of the new epoch at $T_1$ generates an interrupt which causes the GPS processor 84 (FIG. 4) to issue a command to begin data capture. Such a command is identified in FIG. 7 with numeral 154. The command is such that data capture begins before the beginning of the next epoch. With reference to FIG. 7, the next epoch is identified with numeral 160, and is represented by $T_2$. In accordance with the method of FIGS. 10A–10B, the capture of data samples from the receiver is commenced at the time identified with numeral 156, which is before the commencement of the next epoch.

When the next epoch is detected, a counter begins counting. This is represented in FIG. 10A by step 244 which is performed after step 242. In one implementation example, the counter is part of the offset measurement circuitry 78 in FIG. 4.

Step 246 is then performed. In step 246, the system loops until the next epoch is detected. In the scenario depicted in FIG. 7, the next epoch is $T_2$, and is identified with numeral 160. Once the next epoch has been detected, step 248 is performed.

In step 248, the counter is stopped, and the contents of the counter used to derive the time offset $OS_f$ between the initiation of data capture and the beginning of the next epoch. In the scenario depicted in FIG. 7, this value is represented as $CP_1$, and is the time offset between the initiation of the capture of data segment 158 at the time identified with numeral 156, and the time identified with numeral 160 (FIG. 7), which is the beginning of epoch $T_2$.

Step 250 is then performed. In step 250, the system loops until data capture has been completed. In one implementation, the completion of data capture is detected by GPS processor 84 (FIG. 4) either by an interrupt which is generated or through a polling method. In the scenario depicted in FIG. 7, the completion of the capture of data samples 158 (FIG. 7) is identified with numeral 172 (FIG. 7).

Upon the completion of data capture, step 252 (FIG. 10B) is performed. In step 252, the contents of the counter, which defines $OS_f$, is saved and associated with the captured data samples. In one implementation example, the GPS processor 84 (FIG. 4) reads the contents of the counter maintained in the offset measurement circuitry 78, and defines this value as $CP_1$. The GPS processor 84 then saves this value and associates it with the data samples 158 (FIG. 7).

The system then generates correlation data which describes the degree of correlation between the PN code, Doppler shift, and code phase hypotheses which are desired to be tested. In step 254, the PN code hypothesis to be tested is selected, and in step 256, the Doppler shift hypothesis to be tested is selected. In one implementation, the selected PN code hypothesis is generated by PN code generator 80 (FIG. 4), and then stored in PN code register 192 (FIG. 8). In addition, the Doppler shift hypothesis is generated by Doppler shift generator 184 (FIG. 8).

Step 258 is then performed. In step 258, the receiver samples which have been captured are corrected for the selected Doppler shift hypothesis. In one implementation, the receiver samples are stored in RAM 180 (FIG. 8), and Doppler shift correction circuitry 182 corrects these samples for the selected Doppler shift hypothesis one subframe at a time. Additional detail regarding this implementation is available in U.S. Ser. No. 09/145,055, previously incorporated herein by reference.

Step 260 is then performed. In step 260, a cross-correlation analysis is then performed between the adjusted data from step 258, and the PN code hypothesis which has been selected. According to this step, the integral of the cross-product between the adjusted receiver samples and the PN code, shifted in accordance with a selected code phase hypothesis, is determined for each of a plurality of code phase hypotheses. In one implementation, 2046 code phase hypotheses are tested. These code phase hypotheses are generated by circularly shifting the selected PN hypothesis by a shift value ranging from 0 to 2045 half-chip increments. In one implementation example, this step is performed one subframe at a time. In this implementation, the integration values for the various subframes for a given PN code, Doppler shift and code phase hypothesis are simply added together to obtain the integration value for the frame. In one implementation, this step is performed by the matched filter 82 (FIG. 4 and FIG. 8). In one implementation example, this step is performed in accordance with equations (3), (4), and (5) above.

When step 260 has been completed, step 262 is performed. In step 262, the correlation data obtained in step 260 is combined with any previous correlation data for the same PN code/Doppler shift hypotheses in a manner to be described subsequently. Of course, if this is the first set of correlation data obtained for the given PN code/Doppler shift hypotheses, these values are simply stored. In one implementation example, the completion of the cross-correlation analysis of step 260 is detected by GPS processor 84 (FIG. 4) through either an interrupt or a polling method. In one implementation example, the correlation data for a segment is combined with any previous correlation data using equations (1) and (2) above.

In step 264, a determination is made whether there are any more Doppler shift hypotheses to be tested. If so, a jump is made back to step 256, and the process is repeated beginning at this point. If not, step 266 is performed.

In step 266, a determination is made whether there are any more PN code hypotheses to be tested. If so, a jump is made back to step 254, and the process is repeated beginning at this point. If not, step 268 (FIG. 10C) is performed.

In step 268, a determination is made whether there are any more data segments to be captured for combination with the results which have been accumulated. If so, a jump is made back to step 240 (FIG. 10A), and the process is repeated beginning at this point. If not, the process terminates.

Typically, as the process iterates, there will be fewer PN code and Doppler shift hypotheses to test on each pass. This reduction occurs because some PN codes (satellites) will have been detected and because the range of Doppler shift uncertainty that needs to be tested may be reduced based on observing the Doppler shift values at which previous satellites have been detected.

Also, it should be appreciated that the parameters which are collected for each set of data samples change. For example, with reference to FIG. 7, the first pass is associated with the parameters $OS_1$, $T_2$, and $CP_1$. The second pass, however, is associated with the parameters $T_n$, $OS_2$, and $CP_2$.

It should also be appreciated that the data capture process is not limited to a fixed 20 mS epoch or segment length. In general, it can be adjusted on each pass to a variable length. In one implementation example, it can be adjusted on each pass to a variable length of from 1 to 20 mS, in 1 mS increments. In other implementation examples, longer periods are possible simply by increasing the amount of RAM 400.

Upon the completion of the process 220' of FIGS. 10A–10C, in one implementation, the GPS processor 84 (FIG. 4) has stored within its memory a plurality of correlation arrays, with each array corresponding to a particular PN code hypothesis, and with each row of an array corresponding to a particular Doppler shift hypothesis. Each array represents the combined results derived from multiple sets of samples.

VII. Operation of the Matched Filter

Figure 11A:
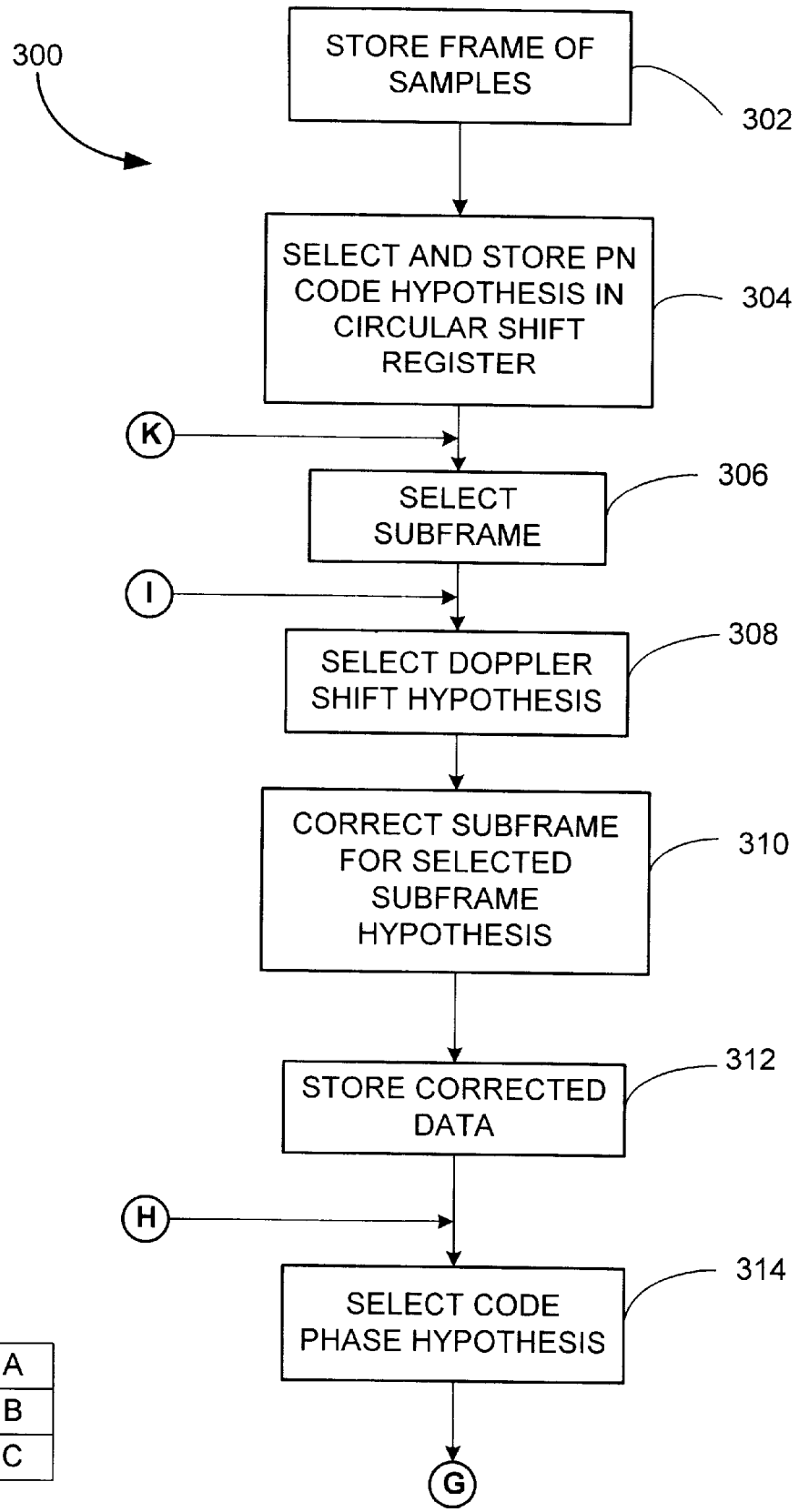
FIGS. 11A–11C illustrate an embodiment of a method of operation of a matched filter in accordance with the subject invention.
Figure 11B:
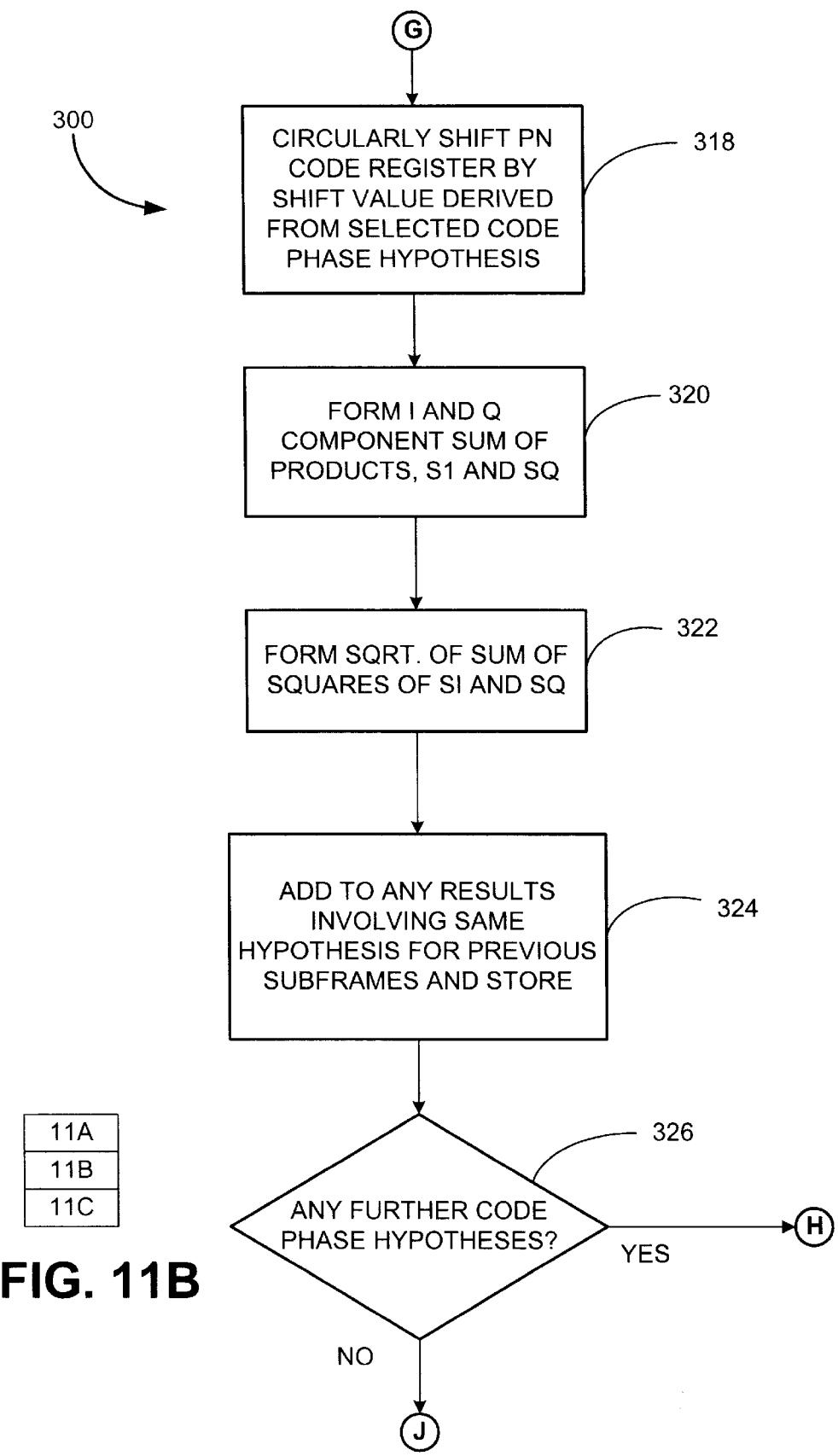
Figure 11C:
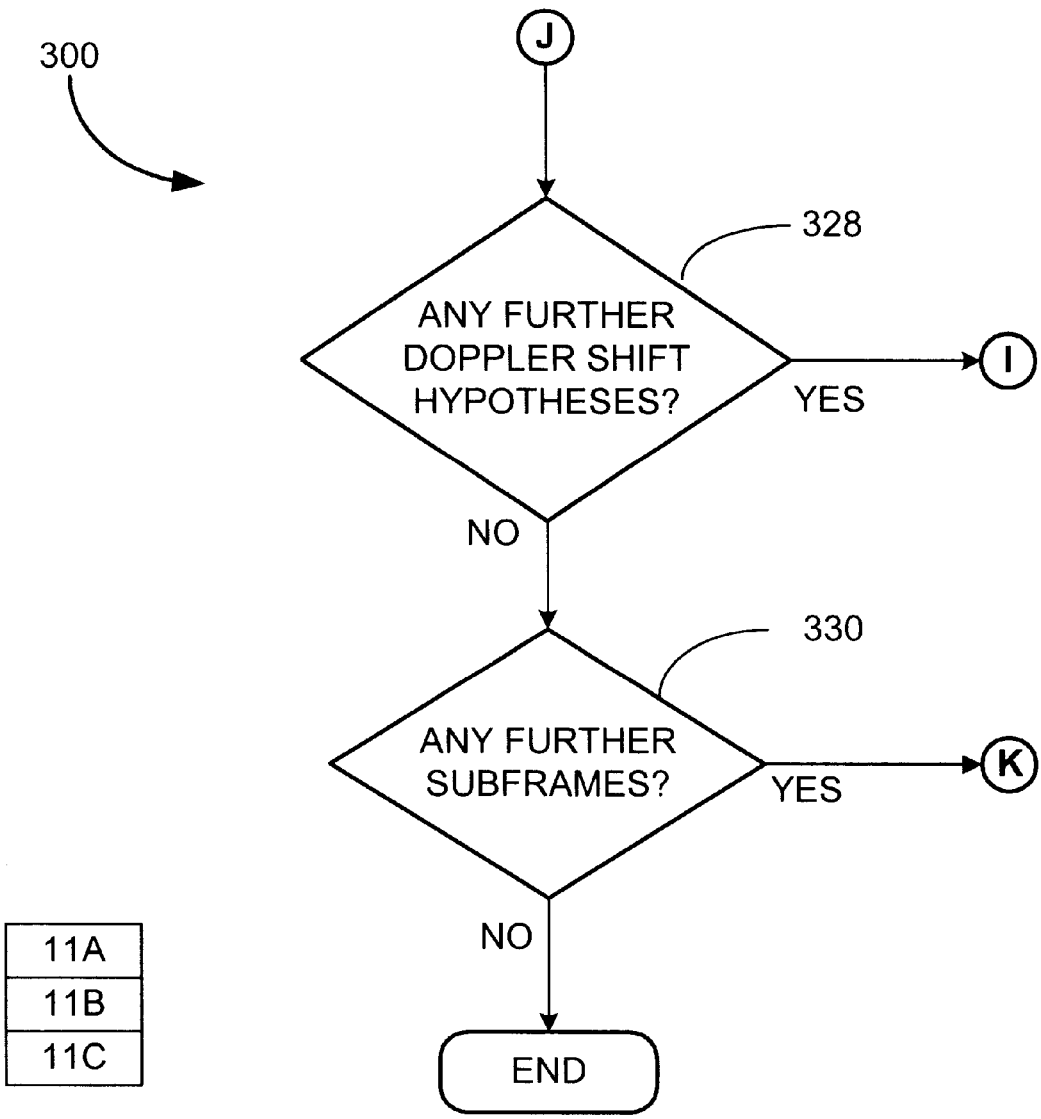

A method 300 of operation of a matched filter in accordance with the subject invention is illustrated in FIGS. 11A–11C. In step 302, a frame of samples is stored. In the matched filter of FIG. 8, the frame of samples is stored in RAM 180.

In step 304, a PN code hypothesis is selected for testing and stored in a circular shift register. In the matched filter of FIG. 8, the PN code hypothesis is stored in PN code register 192.

In step 306, a subframe of the frame of samples stored in step 302 is selected.

In step 308, a Doppler shift hypothesis is selected for testing. In the matched filter of FIG. 8, this step is implicitly performed by Doppler shift generator 184 which successively generates Doppler shift hypothesis responsive to constraints or bounds imposed by a user. In one implementation example, the Doppler shift hypotheses range from ±62,000 Hz.

In step 310, the subframe selected in step 306 is corrected for the Doppler shift hypothesis selected in step 308. In the matched filter of FIG. 8, this step is performed by Doppler shift correction circuitry 182. In one implementation example, this step is performed as described in U.S. Ser. No. 09/145,055, filed Sep. 1, 1998, previously incorporated herein by reference, now U.S. Pat. No. 6,044,105.

In step 312, the corrected data from step 310 is stored, In the matched filter of FIG. 8, the corrected data is stored in sample register 190.

In step 314, a code phase hypothesis is selected for testing. In the matched filter of FIG. 8, this step is implicit in the operation of PN code register 192 which successively and circularly shifts through each of the possible code phase hypotheses in a PN code repetition period, which, in one implementation, comprises 2046 half-chip increments.

In step 318 (FIG. 11B), the PN code hypothesis selected and stored in step 304 is circularly shifted by an amount derived from the code phase hypothesis selected in step 314.

In the matched filter of FIG. 8, the selected code phase hypothesis ranges from 0 to 2045 half-chip increments, and step 318 is implemented by circularly shifting the PN code hypothesis by the number of half-chip increments comprising the selected code phase hypothesis.

In step 320, the product of the shifted PN code from step 318, and the corrected subframe of samples from step 310 is obtained. In one implementation, this step comprises forming the I and Q component sum of products, SI and SQ. In one implementation example, SI and SQ are derived in accordance with equations (3) and (4), presented earlier. In the matched filter of FIG. 8, this step is performed by sum of products circuitry 194.

In step 322, the square root of the sum of the squares of SI and SQ from step 320 is determined in accordance with equation (5), presented earlier. In the matched filter of FIG. 8, this step is performed by sqrt. of sum of products circuitry 198.

In step 324, the value determined in step 322 is added to any similar values derived from the same hypotheses for previous subframes of the frame which is the subject of step 302, and the combined result is then stored. In the matched filter of FIG. 8, this step is performed by the adder 202 in combination with RAM 200, with the combined values being maintained in RAM 200.

In step 326, a determination is made whether there are any further code phase hypotheses which are to be tested for the selected PN code and Doppler shift hypotheses. If so, a jump is made to step 314 and the process beginning at this point repeated for the new code phase hypothesis. If not, step 328 (FIG. 11C) is performed. In the matched filter of FIG. 8, this step is implicit in the operation of PN code register 192, which successively shifts through the 2046 code phase hypotheses to be tested for a given PN code and Doppler shift hypothesis.

In step 328 (FIG. 11C), a determination is made whether there are any further Doppler shift hypotheses which are to be tested for the selected PN code hypothesis. If so, a jump is made to step 308, and the process beginning at this point repeated for the new Doppler shift hypothesis. If not, step 330 is performed. In the matched filter of FIG. 8, this step is implicit in the operation of Doppler shift generator 184, which cycles through a plurality of Doppler shift hypotheses for a given PN code hypothesis. In one implementation example, the Doppler shift hypotheses tested for a given PN code hypothesis range from ±62,000 Hz.

In step 330, a determination is made whether there are any further subframes to be analyzed of the frame which is the subject of step 302. If so, a jump is made to step 306 and the process beginning at this point repeats itself using the new subframe. If not, the process terminates. In one implementation, the method illustrated in FIGS. 11A–11C is then repeated for each PN code hypothesis which is to be tested. In one implementation example, the coordination of this task is performed by GPS processor 84 (FIG. 4).

VIII. First Embodiment of a Method to Update Cumulative Correlation Data

Figure 12:
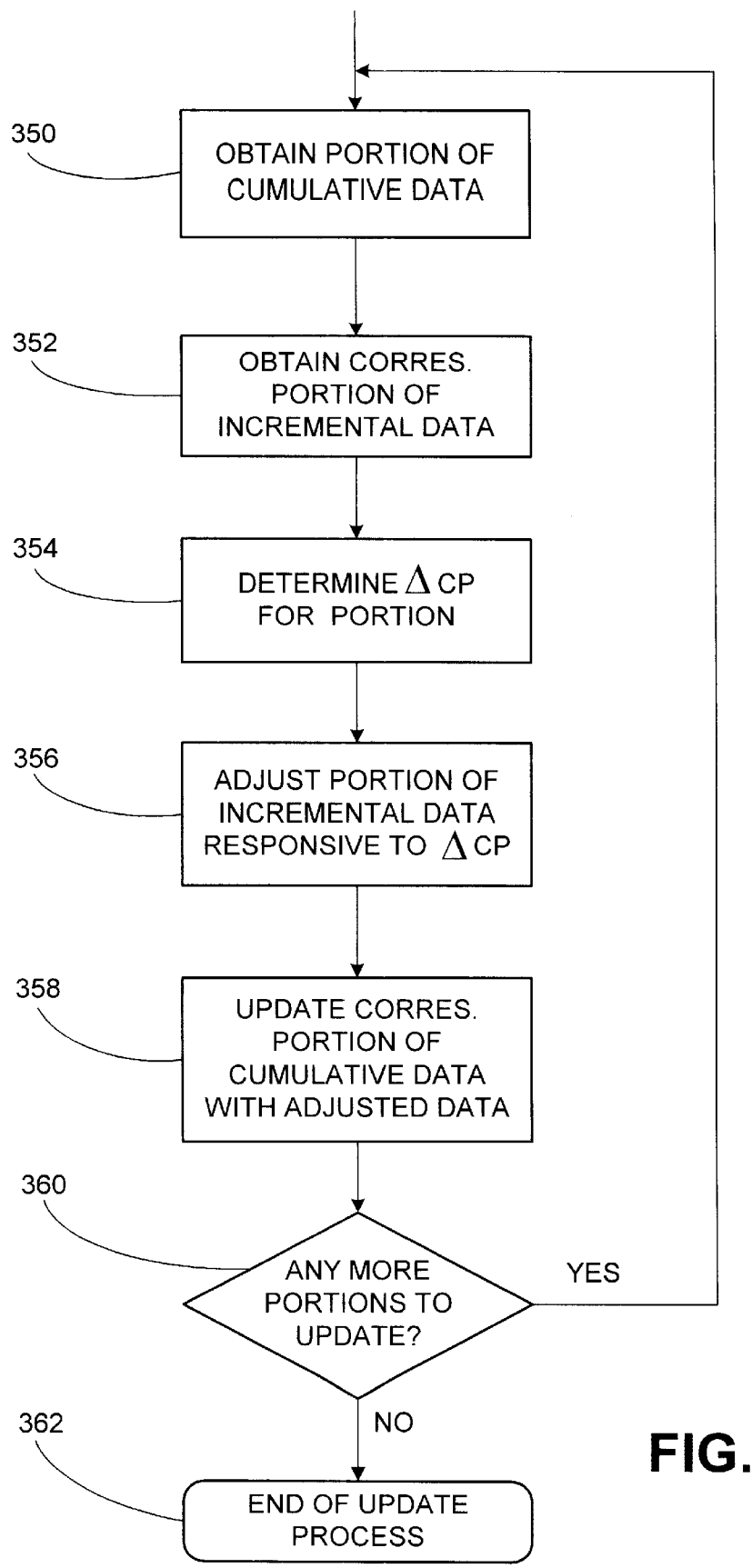
FIG. 12 illustrates an embodiment of a method of operation of a GPS receiver in accordance with the subject invention.

Next, the discussion turns to a suitable method for combining the data. An embodiment of method of updating the cumulative correlation data with the correlation data derived from a new segment in accordance with the subject invention is illustrated in FIG. 12. In step 350, a portion of the cumulative correlation data which is to be updated is obtained. In one implementation, this portion is the cumulative correlation data which corresponds to a particular combination of PN code and Doppler shift hypotheses.

In step 352, the corresponding portion of the incremental correlation data, that is, the correlation data derived from a new segment, is obtained. In one implementation, this portion is the incremental correlation data which corresponds to a particular combination of PN code and Doppler shift hypotheses.

In step 354, the code phase difference, ACP, between the two portions is determined. In one implementation, this value is derived from the Doppler shift hypothesis corresponding to the two portions, and the time difference between the start of a first segment of samples and a second segment of samples. In one implementation example, ACP is determined in accordance with equations (1) and (2) above.

In step 356, the portion of the incremental correlation data obtained in step 352 is adjusted responsive to the code phase difference between the two portions determined in step 354. In one implementation, this step comprises circularly shifting a row of the incremental data by a value derived from the code phase difference determined in step 354. In one implementation example, the value ACP is computed using equations (1) and (2) above, and the shift value, SHIFT, is determined from the following equation:

$$\text{SHIFT} = -\Delta CP \text{ modulo } 2046 \quad (6)$$

In step 358, the portion of the cumulative correlation data obtained in step 350 is updated with the adjusted data determined in step 358. In one implementation, this step comprises adding a row of circularly shifted incremental data element by element to a corresponding row of cumulative data.

In step 360, a determination is made whether there are any additional portions of cumulative data to update. If so, the process repeats beginning with step 350 for another portion of the cumulative data which is to be updated. If not, the process ends as indicated by identifying numeral 362.

IX. Second Embodiment of a Method to Update Cumulative Correlation Data

Figure 13A:
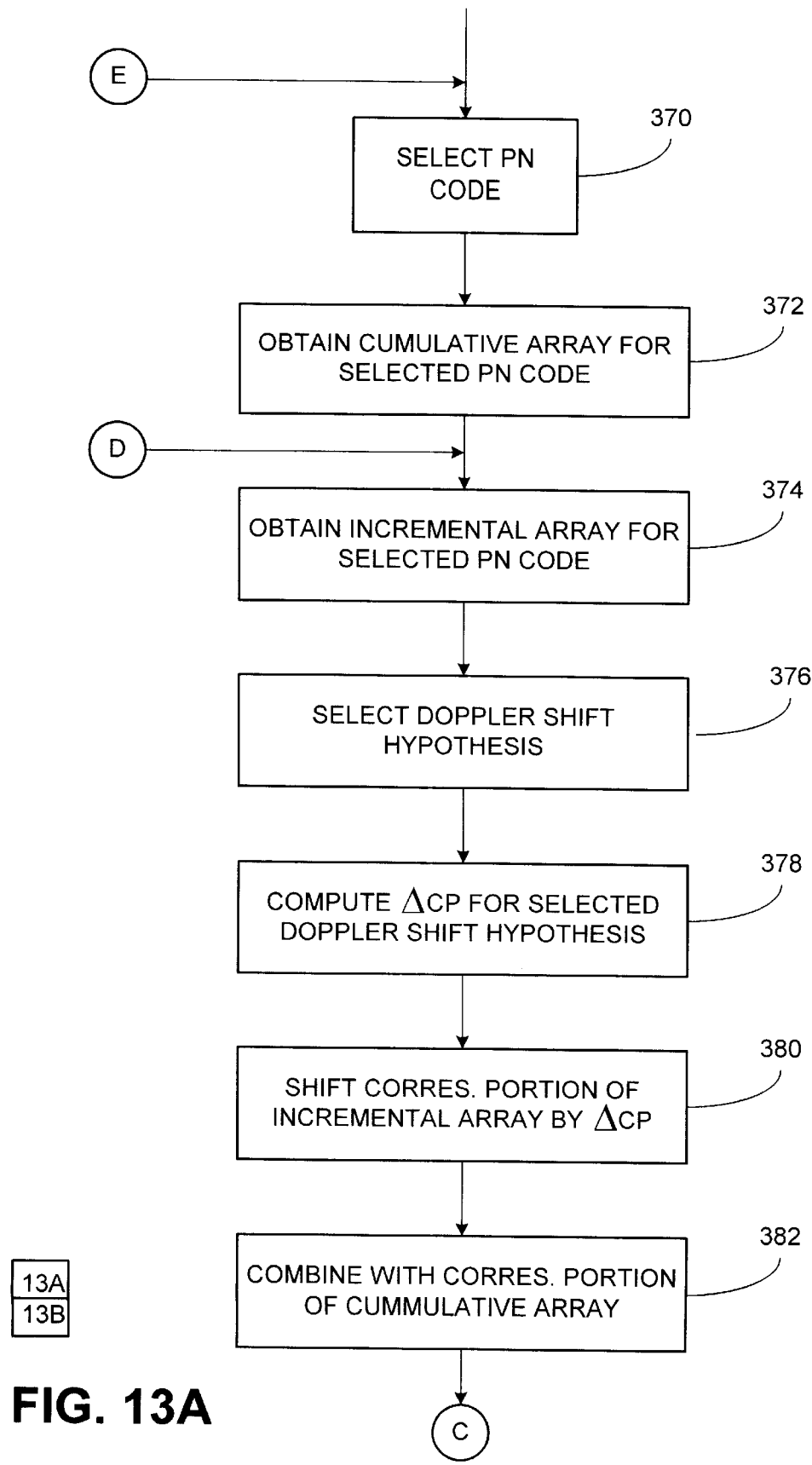
FIGS. 13A–13B illustrate an embodiment of a method of operation of a GPS receiver in accordance with the subject invention.
Figure 13B:
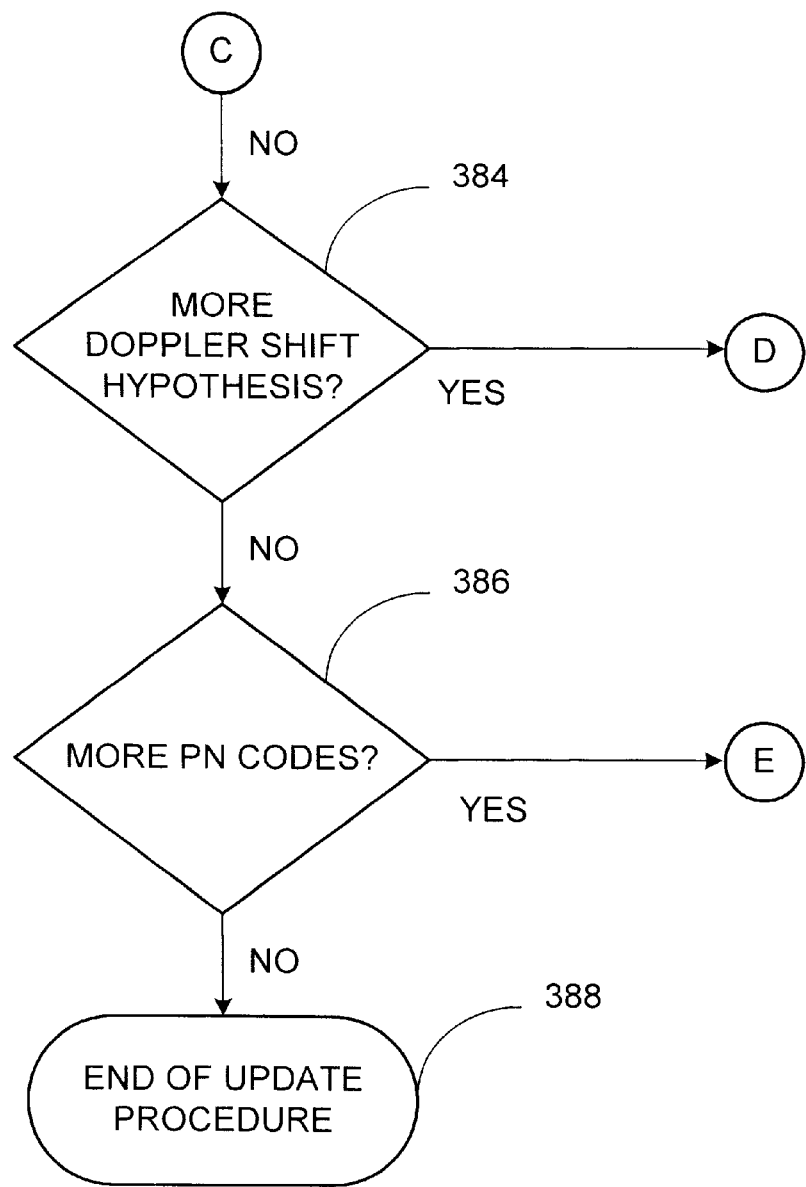

A second embodiment of a method of updating cumulative correlation data with incremental correlation data is illustrated in FIGS. 13A and 13B. In this embodiment, it is assumed that each of the cumulative data and the incremental data are of the form shown in FIG. 5.

Again, the process is iterative, and each cycle of the process begins at step 370, in which a PN code hypothesis is selected. Then, in step 372, the cumulative correlation array for the selected PN code hypothesis is obtained, and in step 374, the incremental correlation array for the selected PN code hypothesis is obtained.

In step 376, a Doppler shift hypothesis is selected, and in step 378 (FIG. 13A), the code phase difference, ACP, for the selected Doppler shift hypothesis is determined. In one implementation, this value is determined in accordance with equations (1) and (2) above.

In step 380, the corresponding row of the incremental array obtained in step 374 is circularly shifted by an amount derived from the code phase difference determined in step 378. In one implementation, this value is determined in accordance with equation (6) above.

Then, in step 382, the shifted row from step 380 is added element by element to the corresponding row in the cumulative array.

In step 384 (FIG. 13B), a determination is made whether there are additional Doppler shift hypotheses to be updated. If so, a jump is made to step 376 (FIG. 13A) whereupon the process beginning at this step is repeated for one of the additional Doppler shift hypotheses to be updated. If not, step 386 is performed. In step 386, a determination is made whether there are additional PN code hypotheses to be updated. If so, a jump is made to step 370 (FIG. 13A) whereupon the process beginning at this step is repeated for one of the additional PN code hypotheses to be updated, the process terminates, as indicated by identifying numeral 388.

X. Implementation Example

A matched filter chip code-named "Magna" which combines the functionality of the sampling circuitry 74, the timing circuitry 76, offset measurement circuit 78, and the matched filter 82 of FIG. 4 has been developed by the assignee of the subject application (Conexant Systems, Inc. of Newport Beach, Calif.). A processor chip which embodies the functionality of the GPS processor 84 of FIG. 4 code-named "Scorpio", Part No. 11577-11, is available from the assignee of the subject application. In one implementation, the processor has additional GPS-specific circuits, such as tracking channels for continuously tracking a number of GPS satellite signals 20 (FIG. 1). Typically, the processor includes at least an embedded microprocessor with an external bus. In one configuration, the processor views the matched filter chip as a memory mapped peripheral. It issues commands to the matched filter chip, and retrieves results after it has completed processing for a given set of commands. An RF receiver chip which embodies the functionality of the GPS radio receiver 72 of FIG. 4 code-named "Gemini/Pices Monopack", Part No. R6732-13, is available from the assignee of the subject application. Additional details regarding this implementation example are available in U.S. Ser. No. 09/145,055, filed Sep. 1, 1998 previously incorporated herein by reference, now U.S. Pat. No. 6,044, 105.

The foregoing embodiments, implementations, and implementation examples improve the signal to noise ratio (SNR) of a correlation array through repeated application of a matched filtering operation. The approach described has a number of advantages, which are as follows:

1. The embodiments, implementations, and examples are adaptable to any time base. This means that they can be applied to GPS chip sets, cellular and PCS chip sets, and standard microprocessors.

2. The embodiments, implementations, and implementation examples allow for the combination of non-uniform receiver sample capture lengths. This is critical for integrated applications such as cellular and PCS, in which it is desirable to receive GPS when the phone is not transmitting. Since the available idle slots will have different durations in the various phone standards, adaptability of time intervals is important.

3. The embodiments, implementations, and implementation examples allow arbitrary offsets in the start of the data capture times. This again is most important for phone applications, but it is also important for the basic GPS application. In the GPS application, a flexible start time capability allows the same capture to be used with any satellite in the received samples, regardless of their relative code phases.

4. Multiple data capture combining allows SNR to be built up incrementally. After each increment is added, the arrays can be tested for signal detection, and processing for successful acquisitions curtailed.

5. Processor RAM and throughput is minimized. This is important for phone applications, in which the baseband device's digital signal processor (DSP) and protocol stack processors may be busy and RAM limited. For high SNR cases, the entire required RAM for a given PN code is located on or within the matched filter. When data combining is required to improve SNR, only those satellite that have not been detected need be processed. Further, it is often possible in phone systems to reduce the size of the array to less than 2046 elements per PN code and Doppler shift hypothesis, and to a few Doppler shift hypotheses, using information that is inherent in mobile phone network operation.

6. While the discussion here has focused on GPS, the invention can be applied to any system using correlation methods for detecting signals. This would include most spread spectrum systems, and general signal detectors.

7. Although embodiments and implementations have been described which utilize a GPS processor to perform various functions, it should be understood that embodiments are possible in which a generic processor is used to perform these functions. For purposes of this disclosure, a generic processor is defined to mean any device, including a computer, DSP, baseband processor, microprocessor, or microcomputer, which is capable of executing a discrete series of instructions stored in a memory accessible by the processor. It should also be understood that embodiments are possible in which analog circuitry is used to perform these functions.

While various embodiments of the application have been described, it will be apparent to those of ordinary skill in the art that many more embodiments and implementations are possible that are within the scope of the subject invention. Accordingly, the invention is not to be restricted except in light of the appended claims and their equivalents.

What is claimed is:

1. A signal detector comprising:
   a receiver for receiving a first segment of a signal, and a second segment of the signal, the first and second segments representing separate and distinct periods of time, and the signal comprising a signal of interest perturbed by noise or pseudo-noise;
   a correlator coupled to the receiver for deriving first correlation data, representative of the correlation between the first segment and a hypothesis, and second correlation data representative of the correlation between the second segment and the hypothesis; and a combiner coupled to the correlator for determining a parameter difference between the first and second correlation data, for adjusting a selected one of the first and second correlation data responsive to the parameter difference, and combining the adjusted data with the other of the first and second correlation data to obtain cumulative correlation data useful for detecting the signal of interest or a parameter of the signal of interest.

2. The signal detector of claim 1 in which the receiver is an RF receiver.

3. The signal detector is claim 1 in which the signal of interest is a carrier signal modulated with a repeating PN code.

4. The signal detector of claim 1 in which the correlator is a matched filter.

5. The signal detector of claim 1 in which the combiner is a processor.

6. The signal detector of claim 1 in which the parameter difference is a code phase difference, and the combiner is configured to adjust the selected one of the first and second correlation data responsive to the code phase difference.

7. The signal detector of claim 1 in which the combiner is configured to successively combine the correlation data for successive segments until the signal of interest or a parameter of the signal of interest can be accurately and reliably detected.

8. The signal detector of claim 7 in which the parameter of the signal of interest is the code phase of the signal.

9. The signal detector of claim 7 in which the parameter of the signal of interest is the presence of the signal.

10. A signal detector comprising:
    a receiver for receiving a first segment of a signal and a second segment of the signal, the signal representative of a plurality of signals of interest, each signal of interest representative of a repeating PN code modulated onto a carrier signal, and the first and second segments representing separate and distinct periods of time;
    a correlator coupled to the receiver for deriving first correlation data representative of the correlation between the first segment and a combined PN code and code phase hypotheses, and second correlation data representative of the correlation between the second segment and the combined PN code and code phase hypothesis; and
    a combiner coupled to the correlator for determining a code phase difference between portions of the first and second correlation data corresponding to the PN code hypothesis, for adjusting a selected one of the portions of the first and second correlation data responsive to the code phase difference, and combining the adjusted data with the other portion to obtain cumulative correlation data useful for detecting a signal of interest or a parameter of a signal of interest.

11. The signal detector of claim 10 in which the correlator is configured to derive correlation data representative of the correlation between a segment and a plurality of code, code phase, and Doppler shift hypotheses.

12. A GPS receiver including either of the signal detectors of claims 1 and 10.

13. A method for detecting a signal comprising:
    receiving a first segment of a signal, and a second segment of the signal, the signal comprising a signal of interest perturbed by noise or pseudo-noise, and the first and second segments representing separate and distinct periods of time;
    deriving first correlation data representative of the correlation between the first segment and a hypothesis, and second correlation data representative of the correlation between the second segment and the hypothesis;
    determining a parameter difference between the first and second correlation data;
    adjusting a selected one of the first and second correlation data responsive to the parameter difference; and
    combining the adjusted data with the other of the first and second correlation data to obtain cumulative correlation data useful for detecting the signal of interest or a parameter of the signal of interest.

14. The method of claim 13 wherein the signal of interest is a carrier signal modulated with a repeating PN code.

15. The method of claim 13 wherein the parameter difference is a code phase difference.

16. The method of claim 15 wherein the adjusting step comprises shifting the selected one of the first and second correlation data responsive to the code phase difference.

17. A method for detecting a signal comprising:
    receiving a first segment of a signal and a second segment of the signal, the signal representative of a plurality of signals of interest, each signal of interest representative of a repeating PN code modulated onto a carrier signal, the first and second segments representing separate and distinct periods of time;
    deriving first correlation data representative of the correlation between the first segment and a combined PN code and code phase hypothesis, and second correlation data representative of the correlation between the second segment and the combined PN code and code phase hypothesis;

determining a code phase difference between portions of the first and second correlation data corresponding to the PN code hypothesis;

adjusting a selected one of the portions of the first and second correlation data responsive to the code phase difference; and combining the adjusted data with the other portion to obtain cumulative correlation data useful for detecting a signal of interest or a parameter of a signal of interest.

18. The method of claim 17 further comprising successively combining the cumulative correlation data with correlation data from successive segments until the presence and code phase of a signal of interest can be accurately and reliably detected.

19. The method of claim 17 further comprising deriving correlation data representative of the correlation between a segment and a plurality of code, code phase, and Doppler shift hypotheses.

20. The method of claim 19 wherein the portions of the first and second correlation data correspond to a Doppler shift hypothesis, and the code phase difference is determined from the time period between the beginning of the first and second segments and the Doppler shift hypothesis corresponding to the portions.

21. The method of claim 20 wherein the adjusting step comprises circularly shifting the selected portion by a value derived from the code phase difference between the two portions.

22. A signal detector, comprising:

means for receiving a signal of interest comprising a first segment and a second segment of the signal of interest, each segment representing a distinct period of time;

means for correlating a first correlation data corresponding to a first correlation between the first segment and a hypothesis, and for deriving a second correlation data corresponding to a second correlation between the second segment and the hypothesis;

means for determining a parameter difference between the first and the second correlation data;

means for adjusting a selected one of the first and the second correlation data in response to the parameter difference to determine an adjusted data; and means for combining the adjusted data with the non-selected correlation data for generating a cumulative correlation data for detecting the signal of interest.

23. The signal detector of claim 22, wherein the time period for the first segment and the time period for the second segment are separate, nonoverlapping time periods.

24. The signal detector of claim 22, wherein the signal of interest is representative of a plurality of signals of interest.

25. The signal detector of claim 22, wherein the signal of interest is representative of a repeating PN code modulated onto a carrier signal.

26. The signal detector of claim 22, wherein the hypothesis is a combined PN code and code phase hypothesis.

27. The signal detector of claim 22, wherein the means for correlating further performs the function of deriving the cumulative correlation data representative of the correlation between the first segment and a plurality of code, code phase, and Doppler shift hypotheses, and between the second segment and the plurality of code, code phase, and Doppler shift hypotheses.

28. The signal detector of claim 27, wherein a first portion of the first correlation data corresponds to a Doppler shift hypothesis and a second portion of the second correlation data corresponds to the Doppler shift hypothesis, and a code phase difference is determined from a time period between the beginning of the first segment and the Doppler shift hypothesis corresponding to the first portion, and between the beginning of the second segment and the Doppler shift hypothesis corresponding to the second portion.

29. The signal detector of claim 28, wherein the means for adjusting circularly shifts the selected portion by a value derived from the code phase difference between the first and the second portion.

30. The signal detector of claim 22, wherein the signal detector detects an at least one global positioning system (GPS) signal.

31. The signal detector of claim 22, wherein the parameter difference comprises a code phase difference.

32. The signal detector of claim 22, wherein the means for adjusting shifts the selected correlation data.

33. The signal detector of claim 22, wherein the signal of interest is perturbed by noise.

34. The signal detector of claim 22, wherein the signal of interest is perturbed by pseudo-noise.

35. The signal detector of claim 22, wherein the means for receiving comprises a radio frequency receiver.

36. The signal detector of claim 22, wherein the signal of interest comprises a carrier signal modulated with a pseudo-noise code.

37. The signal detector of claim 22, wherein the means for correlating comprises a matched filter.

38. The signal detector of claim 22, wherein the means for combining comprises a processor.

39. The signal detector of claim 22, wherein the means for combining successively combines the correlation data for a plurality of successive segments to detect the signal of interest.

40. The signal detector of claim 22, wherein the means for combining successively combines the correlation data for a plurality of successive segments to detect a parameter of the signal of interest.

41. The signal detector of claim 40, wherein the parameter comprises a code phase of the signal of interest.

42. The signal detector of claim 40, wherein the parameter comprises the presence of the signal of interest.

43. A signal detector, comprising:

a receiver configured to detect a first segment of a signal of interest and a second segment of the signal of interest, and the first segment and the second segment representing distinct periods of time;

a correlator, coupled to the receiver, configured to derive a first correlation data representative of the correlation between the first segment and a hypotheses, and configured to derive a second correlation data representative of the correlation between the second segment and the hypothesis;

a parameter determiner, coupled to the correlator, configured to determine a parameter difference between the first and the second correlation data;

a processor, coupled to the parameter determiner, configured to adjust a selected one of the first and second correlation data responsive to the parameter difference to determine an adjusted data; and a combiner, coupled to the processor, configured to combine the adjusted data with the non-selected correlation data to generate cumulative correlation data useful for detecting the signal of interest.

44. The signal detector of claim 43, wherein the time period for the first segment and the time period for the second segment are separate, nonoverlapping time periods.

45. The signal detector of claim 43, wherein the signal of interest is representative of a plurality of signals of interest.

46. The signal detector of claim 43, therein the signal of interest is representative of a repeating PN code modulated onto a carrier signal.

47. The signal detector of claim 43, wherein the hypothesis is a combined PN code and code phase hypothesis.

48. The signal detector of claim 43, wherein the correlator is configured to derive correlation data representative of the correlation between the first segment and a plurality of code, code phase, and Doppler shift hypotheses, and between the second segment and the plurality of code, code phase, and Doppler shift hypotheses.

49. The signal detector of claim 48, wherein a first portion of the first correlation data corresponds to a Doppler shift hypothesis and a second portion of the second correlation data corresponds to the Doppler shift hypothesis, and a code phase difference is determined from a time period between the beginning of the first segment and the Doppler shift hypothesis corresponding to the first portion, and between the beginning of the second segment and the Doppler shift hypothesis corresponding to the second portion.

50. The signal detector of claim 49, wherein the processor circularly shifts the selected portion by a value derived from the code phase difference between the first and the second portion.

51. The signal detector of claim 43, wherein the signal detector detects an at least one global positioning system (GPS) signal.

52. The signal detector of claim 43, wherein the parameter difference comprises a code phase difference.

53. The signal detector of claim 43, wherein the processor shifts the selected correlation data.

54. The signal detector of claim 43, wherein the signal of interest is perturbed by noise.

55. The signal detector of claim 54, wherein the parameter comprises a code phase difference.

56. The signal detector of claim 54, wherein the parameter comprises the presence of the signal of interest.

57. The signal detector of claim 43, wherein the signal of interest is perturbed by pseudo-noise.

58. The signal detector of claim 43, wherein the receiver comprises a radio frequency receiver.

59. The signal detector of claim 43, wherein the signal of interest comprises a carrier signal modulated with a pseudo-noise code.

60. The signal detector of claim 43, wherein the correlator is a matched filter.

61. The signal detector of claim 43, wherein the combiner comprises a processor.

62. The signal detector of claim 43, wherein the combiner successively combines the correlation data for a plurality of successive segments to detect the signal of interest.

63. The signal detector of claim 43, wherein the combiner successively combines the correlation data for a plurality of successive segments to detect a parameter of the signal of interest.

64. A method for detecting signals of interest, comprising the steps of:
receiving a first segment of a signal of interest;
receiving a second segment of the signal of interest;
deriving a first correlation data representative of the correlation between the first segment and a hypothesis;
deriving a second correlation data representative of the correlation between the second segment and the hypothesis;
determining a parameter difference between the first aid the second correlation data;
selecting one of the first and the second correlation data;
adjusting the selected correlation data in response to the parameter difference to determine an adjusted data; and
combining the adjusted data with the non-selected correlation data to determine a cumulative correlation data useful for detecting the signal of interest.

65. The method of claim 64, wherein the period of time for the first segment and the time period for the second segment are separate, nonoverlapping time periods.

66. The method of claim 64, wherein the signal of interest is representative of a plurality of signals of interest.

67. The method of claim 64, wherein the signal of interest is a carrier signal modulated with a repeating PN code.

68. The method of claim 64, wherein the hypothesis is a combined PN code and code phase hypothesis.

69. The method of claim 64, wherein the correlation data is representative of the correlation between the first segment and a plurality of code, code phase, and Doppler shift hypotheses, and between the second segment and the plurality of code, code phase, and Doppler shift hypotheses.

70. The method of claim 69, wherein a first portion of the first correlation data corresponds to a Doppler shift hypothesis and a second portion of the second correlation data corresponds to the Doppler shift hypothesis, and a code phase difference is determined from a time period between the beginning of the first segment and the Doppler shift hypothesis corresponding to the first portion, and between the beginning of the second segment and the Doppler shift hypothesis corresponding to the second portion.

71. The method of claim 70, wherein the adjusting step comprises circularly shifting the selected portion by a value derived from the code phase difference between the first and the second portion.

72. The method of claim 64, wherein the receiving step receives at least one global positioning system (GPS) signal.

73. The method of claim 64, wherein the parameter difference is a code phase difference.

74. The method of claim 64, wherein the adjusting step is implemented by shifting the selected correlation data.

75. The method of claim 64, wherein the signal of interest is perturbed by noise.

76. The method of claim 64, wherein the signal of interest is perturbed by pseudo-noise.

77. The method of claim 64, wherein the receiving step is implemented with a radio frequency receiver.

78. The method of claim 64, wherein the signal of interest comprises a carrier signal modulated with a pseudo-noise code.

79. The method of claim 64, wherein the combining step is implemented with a matched filter.

80. The method of claim 64, wherein the combining step successively combines the correlation data for a plurality of successive segments to detect the signal of interest.

81. The method of claim 64, wherein the combining step successively combines the correlation data for a plurality of successive segments to detect a parameter of the signal of interest.

82. The method of claim 81, wherein the parameter comprises a code phase of the signal of interest.

83. The method of claim 81, wherein the parameter comprises the presence of the signal of interest.

84. A computer readable medium having a program for storing a series of instructions for detecting signals of interest, the program for performing at least the following:
receiving a first segment of a signal of interest;

receiving a second segment of the signal of interest, such that the first segment and the second segment represent distinct periods of time;

deriving a first correlation data representative of the correlation between the first segment and a hypothesis;

deriving a second correlation data representative of the correlation between the second segment and the hypothesis;

determining a parameter difference between the first and the second correlation data;

selecting one of the first and the second correlation data;

adjusting the selected correlation data in response to the parameter difference to determine an adjusted data; and combining the adjusted data with the non-selected correlation data to determine a cumulative correlation data useful for detecting the signal of interest.

85. The medium as defined in claim 84, further comprising a series of instructions determining a code phase difference between portions of the first correlation data and the second correlation data such that each the code phase corresponds to a combination of a PN code, Doppler shift, and code phase hypothesis; and, further comprising the series of instructions adjusting a selected one of the portions of the first correlation data and the second correlation data responsive to the code phase difference.

86. The medium as defined in claim 85, wherein the series of instructions determining the code phase difference is determined in accordance with an equation $\Delta CP=[(F_{PN}+D)\times \Delta T]$ modulo $T_{PN}$, wherein $\Delta CP$ is the code phase difference, $F_{PN}$ is a PN rate, D is a Doppler shift hypothesis, $\Delta T$ is a time offset between the beginning of the first segment and the beginning of the second segment, and TPN is a period of the PN codes.

87. The medium as defined in claim 86, wherein each of the first segment and the second segment span at least a frame, and begin at a time which is an offset from a frame mark, and the offsets for the first segment and the second segment, an $OS_1$ and $OS_2$, respectively, are used to determine the $\Delta T$ in accordance with an equation $\Delta T=(T_n-T_2+OS_1-OS_2)\times S$, where $T_n$ is the timing of the frame mark which occurs at the beginning of the second segment, and from which the $OS_2$ is defined, a $T_2$ is the timing of the frame mark which occurs at the beginning of the first segment, and from which the OS, is defined, and a variable S is the error in a time base.

* * * * *